(12) United States Patent
Tateishi

(10) Patent No.: US 8,070,868 B2
(45) Date of Patent: Dec. 6, 2011

(54) INK, INKJET INK, INKJET RECORDING METHOD AND METHOD FOR IMPROVING WEATHER RESISTANCE OF COLOR IMAGE MATERIAL

(75) Inventor: Keiichi Tateishi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 517 days.

(21) Appl. No.: 12/161,225

(22) PCT Filed: Jan. 19, 2007

(86) PCT No.: PCT/JP2007/051210
§ 371 (c)(1),
(2), (4) Date: Jul. 17, 2008

(87) PCT Pub. No.: WO2007/083840
PCT Pub. Date: Jul. 26, 2007

(65) Prior Publication Data
US 2010/0245509 A1    Sep. 30, 2010

(30) Foreign Application Priority Data
Jan. 19, 2006   (JP) .................................. 2006-011427

(51) Int. Cl.
*C09D 11/00* (2006.01)
*C09D 11/02* (2006.01)
(52) U.S. Cl. .................................... 106/31.5; 106/31.48
(58) Field of Classification Search ............... 106/31.46, 106/31.48, 31.5, 31.76, 31.77, 31.79; 534/752, 534/755, 758, 766–769; 347/100
See application file for complete search history.

(56) References Cited

U.S. PATENT DOCUMENTS

| | | | | |
|---|---|---|---|---|
| 4,263,204 | A * | 4/1981 | Merlo et al. ................... | 534/766 |
| 4,282,144 | A * | 8/1981 | Weaver et al. ................ | 534/768 |
| 4,650,861 | A * | 3/1987 | Weaver et al. ................ | 534/777 |
| 4,885,272 | A * | 12/1989 | Chapman et al. ............. | 503/227 |
| 5,324,826 | A * | 6/1994 | Matzinger ..................... | 534/766 |
| 5,446,136 | A * | 8/1995 | Pape et al. ..................... | 534/753 |
| 6,225,023 | B1 * | 5/2001 | Okamoto et al. ........ | 430/270.16 |
| 6,582,502 | B2 * | 6/2003 | Fujiwara ..................... | 106/31.48 |
| 6,878,196 | B2 * | 4/2005 | Harada et al. ............. | 106/31.48 |
| 7,108,743 | B2 * | 9/2006 | Fujiwara et al. ........... | 106/31.48 |
| 7,281,788 | B2 * | 10/2007 | Yabuki et al. ................ | 347/100 |
| 7,601,819 | B2 * | 10/2009 | Seto et al. ..................... | 534/766 |
| 2005/0175908 | A1 * | 8/2005 | Seto et al. ......................... | 430/7 |
| 2008/0081284 | A1 * | 4/2008 | Watanabe et al. ........ | 430/270.14 |
| 2008/0274283 | A1 * | 11/2008 | Tateishi et al. ................ | 534/753 |
| 2010/0160504 | A1 * | 6/2010 | Morimoto et al. ............ | 524/105 |
| 2010/0221430 | A1 * | 9/2010 | Tateishi ....................... | 534/767 |

FOREIGN PATENT DOCUMENTS

| JP | 55-161856 A | 12/1980 |
|---|---|---|
| JP | 5-331381 A | 12/1993 |
| JP | 6-145543 A | 5/1994 |
| JP | 7-224230 A | 8/1995 |
| JP | 9-234964 A | 9/1997 |
| JP | 9-277703 A | 10/1997 |
| JP | 2002-309115 A | 10/2002 |
| JP | 2003-246942 A | 9/2003 |
| JP | 2003-277662 A | 10/2003 |
| JP | 2004-315732 A | 11/2004 |
| JP | 2005-225979 A | 8/2005 |

OTHER PUBLICATIONS

Abdou O. Abdelhamid et al., "Convenient Synthesis of 3-Arylazopyrazoles and 2-Arylazo-1,3,4,-$\Delta^2$-Thiadiazoline Derivatives from 3-Nitroformazans", Journal of Heterocyclic Chemistry, May-Jun. 1985, vol. 22, No. 3, pp. 813-816.

* cited by examiner

*Primary Examiner* — Helene Klemanski
(74) *Attorney, Agent, or Firm* — Sughrue Mion, PLLC

(57) ABSTRACT

An ink includes at least one coloring matter represented by a formula (I):

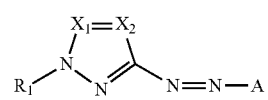

Formula (1)

wherein $R_1$ represents one of an alkyl group, an alkenyl group, an alkynyl group, an aralkyl group, an aryl group, a heterocyclic group, an acyl group, an alkyloxycarbonyl group, an aryloxycarbonyl group, a carbamoyl group, an alkylsulfonyl group, an arylsulfonyl group and a sulfamoyl group, which may have a substituent; $X_1$ represents one of $-CR_2=$ and a nitrogen atom, $R_2$ represents one of a hydrogen atom and a substituent, and when $R_2$ represents a substituent, $R_2$ may have a substituent; $X_2$ represents one of $-CR_3=$ and a nitrogen atom, and $R_3$ represents an electron-withdrawing group having a σp value of 0.20 or more; when $X_1$ represents $-CR_2=$, a pair of $R_1$ and $R_2$ and/or when $X_2$ represents $-CR_3=$, a pair of $R_2$ and $R_3$ each may combine to form a 5- to 7-membered ring; the coloring matter may form one of a dimer and a trimer through $R_1$, $R_2$, $R_3$ or A; and A represents a prescribed aryl group or heterocyclic group etc.

8 Claims, No Drawings

INK, INKJET INK, INKJET RECORDING METHOD AND METHOD FOR IMPROVING WEATHER RESISTANCE OF COLOR IMAGE MATERIAL

TECHNICAL FIELD

The present invention relates to an ink, an inkjet ink, an inkjet recording method and a method for improving the weather resistance of a color image material formed.

BACKGROUND ART

In recent years, the image recording material is predominated by a material particularly for forming a color image and specifically, a recording material of inkjet system, an image recording material of heat-sensitive transfer system, a recording material of electrophotographic system, a silver halide light-sensitive material of transfer system, a printing ink, a recording pen and the like are popularly used. Also, in an image pickup device such as CCD of photographing equipment or in a display such as LCD and PDP, a color filter is used for recording or reproducing a color image. In these color image recording materials or color filters, coloring matters (dyes or pigments) for three primary colors by a so-called additive or subtractive color mixing method are used for displaying or recording a full color image, but a coloring matter having absorption characteristics capable of realizing a preferred color reproduction region and having fastness endurable to various use conditions or environmental conditions is not found at present and improvements are keenly demanded.

The coloring matters used for various uses described above are required in common to have the following properties. That is, the coloring matters are required, for example, to have absorption characteristics preferred in view of color reproduction, exhibit good fastness in the environmental condition on use, such as light fastness, heat resistance, moisture resistance, resistance to oxidative gases (e.g., ozone), and resistance to other chemicals (e.g., sulfurous acid gas), and ensure excellent storage stability as an ink. There is a strong demand for a coloring matter assured of good yellow color hue, fastness to light, moisture, heat and active gases in the environment, and excellent storage stability.

A large number of azo dyes comprising a nitrogen-containing 5-membered ring as the azo component have been heretofore disclosed, but none of these can satisfy the color hue, fastness and molecular extinction coefficient (see, for example, JP-A-55-161856 (the term "JP-A" as used herein means an "unexamined published Japanese patent application"), JP-A-6-145543, JP-A-7-224230, JP-A-9-234964, JP-A-9-277703, JP-A-2003-246942). A synthesis method for the 5-membered heterocyclic azo dye has been also disclosed, but the color hue, spectral absorption coefficient and the like are not satisfied (see, for example, J. Fabian and H. Hartmann, Light Absorption of Organic Colorants, Springer-Verlag, Berline (1980), Heinrich Zollinger, Color Chemistry, Weinheim-New York-Basel-Cambridge, Hiroshi Noguchi, Gosei Senryo (Synthetic Dyes), Sankyo Shuppan (1970), Journal of Heterocyclic Chemistry, Vol. 22, pp. 813-816 (1985)).

In particular, the skeleton of a yellow coloring matter for use in inkjet recording ink is representatively an azo type. As for the representative azo coloring matter, a fast coloring matter having a triazinyl pyrazole skeleton is described in JP-A-2003-277662, but a coloring matter ensuring excellent storage stability as an ink is being demanded (see, for example, JP-A-2003-277662). Furthermore, a modification example of the fast coloring matter having a triazinyl pyrazole skeleton for improving the solution stability is described in JP-A-2005-225979, but because of not having absorption characteristics preferred in view of color reproduction, improvement of the color hue is demanded (see, for example, JP-A-2005-225979).

DISCLOSURE OF THE INVENTION

The present invention has been made to solve those problems in conventional techniques and achieve the following object.

That is, an object of the present invention is to provide 1) a coloring matter which has absorption characteristics to give excellent color reproduction as a coloring matter for three primary colors and at the same time, is assured of sufficiently high fastness to light, heat, moisture and active gases in the environment as well as excellent storage stability in an ink; 2) an ink for printing such as inkjet printing, which can give a color image or color material excellent in the color hue and fastness; and 3) an inkjet recording ink and an inkjet recording method, where excellent storage stability in ink and formation of an image with good color hue and high fastness to light, moisture, heat and active gases in the environment, particularly ozone gas, are ensured.

The present inventors have made intensive studies on pyrazolyl-azo coloring matter derivatives with an attempt to discover a coloring matter having excellent ink stability, good color hue and high fastness to light, ozone, moisture and heat, as a result, it has been found that the above-described object can be attained by the compounds represented by the following formulae (1) and (2). The present invention has been accomplished based on this finding. The means to solve the problems above are as follows.

(1) An ink comprising at least one coloring matter represented by a formula (I):

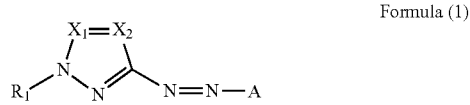

Formula (1)

wherein $R_1$ represents one of an alkyl group, an alkenyl group, an alkynyl group, an aralkyl group, an aryl group, a heterocyclic group, an acyl group, an alkyloxycarbonyl group, an aryloxycarbonyl group, a carbamoyl group, an alkylsulfonyl group, an arylsulfonyl group and a sulfamoyl group, which may have a substituent; $X_1$ represents one of —$CR_2$= and a nitrogen atom, $R_2$ represents one of a hydrogen atom and a substituent, and when $R_2$ represents a substituent, $R_2$ may have a substituent; $X_2$ represents one of —$CR_3$= and a nitrogen atom, and $R_3$ represents an electron-withdrawing group having a σp value of 0.20 or more; when $X_1$ represents —$CR_2$=, a pair of $R_1$ and $R_2$ and/or when $X_2$ represents —$CR_3$=, a pair of $R_2$ and $R_3$ each may combine to form a 5- to 7-membered ring; the coloring matter may form one of a dimer and a trimer through $R_1$, $R_2$, $R_3$ or A; and A represents one group selected from the monovalent substituent groups in a formula (2), which may have a substituent:

Formula (2)

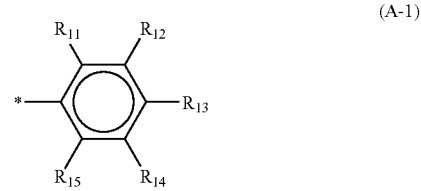

(A-1)

-continued
(A-2) 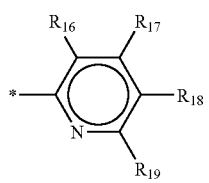
(A-3) 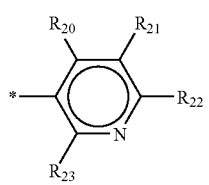
(A-4) 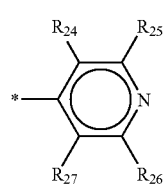
(A-5) 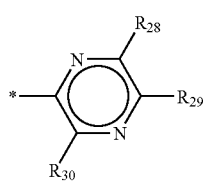
(A-6) 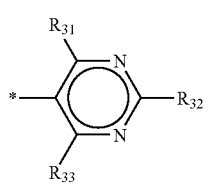
(A-7) 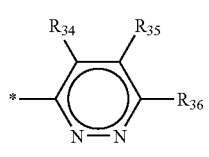
(A-8) 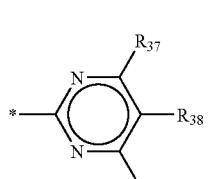
(A-9) 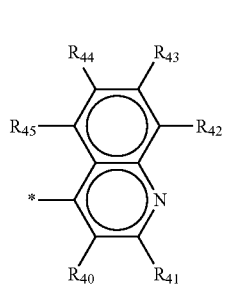
-continued
(A-10) 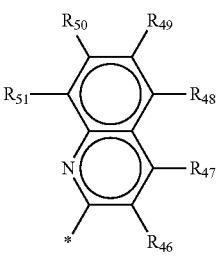
(A-11) 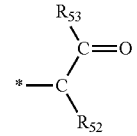
(A-12) 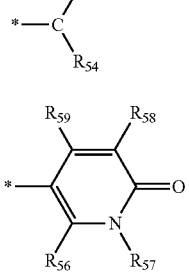
(A-13) 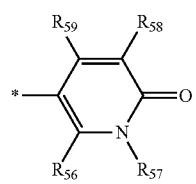
(A-14) 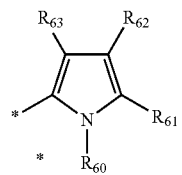
(A-15) 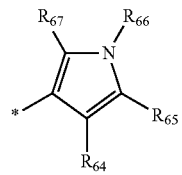
(A-16) 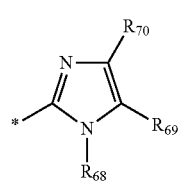
(A-17) 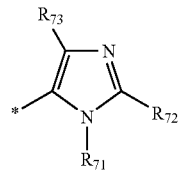

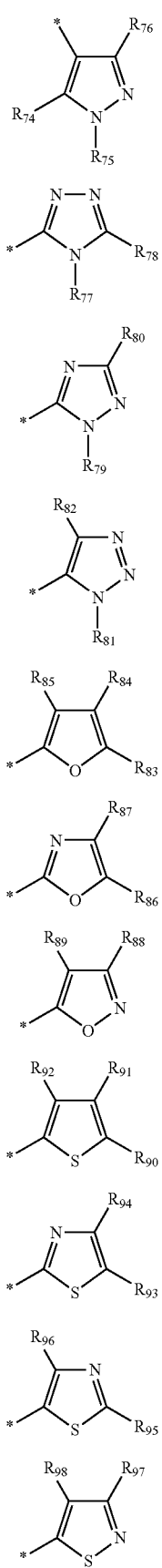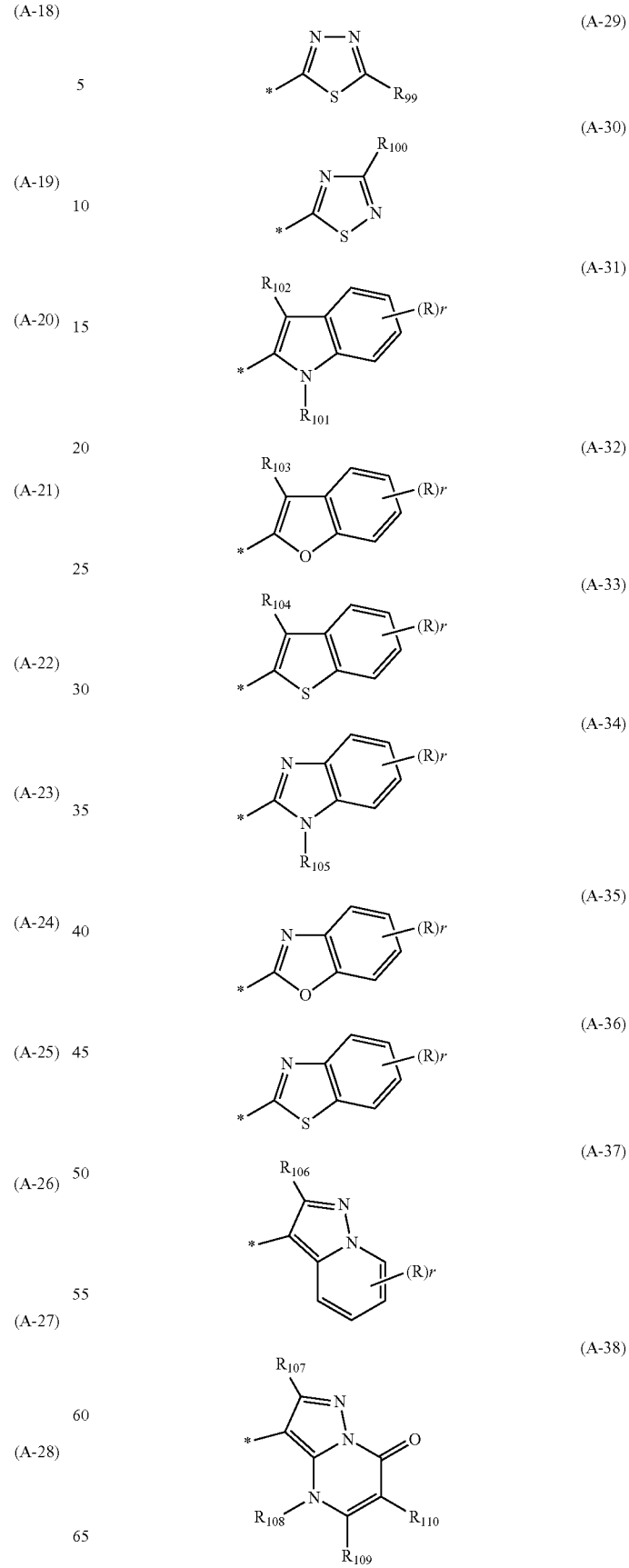

-continued

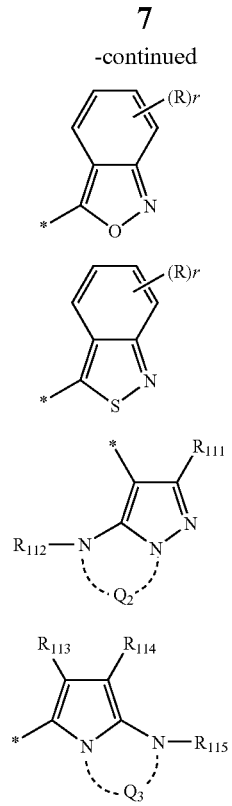

(A-39)

(A-40)

(A-41)

(A-42)

wherein in the monovalent substituent groups (A-1) to (A-42) represented by the formula (2), $R_{11}$ to $R_{115}$ each independently represents one of a hydrogen atom and a substituent; $Q_1$ in (A-12), $Q_2$ in (A-41) and $Q_3$ in (A-42) each represents a nonmetallic atom group necessary for forming one of a 5- to 7-membered hydrocarbon ring together with the nitrogen atom and a 5- to 7-membered heterocyclic ring together with the nitrogen atom; R represents a substituent; r represents an integer of 0 to 4; and when a plurality of substituent R are present, each R's may be independently the same or different.

(2) The ink as described in the item (1), wherein the coloring matter represented by the formula (1) is represented by a formula (3):

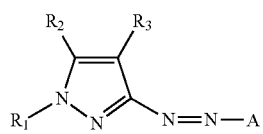

Formula (3)

wherein $R_1$, $R_2$, $R_3$ and A have the same meanings as $R_1$, $R_2$, $R_3$ and A in the formula (1).

(3) The ink as described in the item (1), wherein the coloring matter represented by the formula (1) is represented by a formula (4):

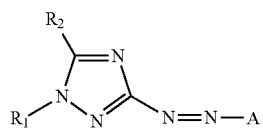

Formula (4)

wherein $R_1$, $R_2$ and A have the same meanings as $R_1$, $R_2$ and A in the formula (1).

(4) An ink comprising at least one coloring matter represented by a formula (5):

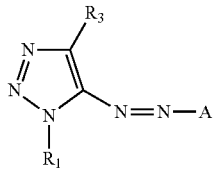

Formula (5)

wherein $R_1$, $R_3$ and A have the same meanings as $R_1$, $R_3$ and A in the formula (1).

(5) An ink comprising at least one coloring matter represented by a formula (6):

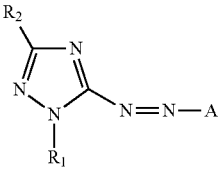

Formula (6)

wherein $R_1$, $R_2$ and A have the same meanings as $R_1$, $R_2$ and A in the formula (1).

(6) The ink as claimed in any one of claims 1 to 5, wherein the coloring matters represented by the formulae (1), (3), (4), (5) and (6) each has at least one ionic hydrophilic group.

(7) An inkjet recording ink comprising the ink claimed in any one of claims 1 to 6.

(8) An inkjet recording method comprising forming an image by using the ink claimed in claim 7.

(9) An inkjet recording method comprising forming an image on an image-receiving material by using the ink claimed in claim 7, the image-receiving material comprising a support having thereon an ink image-receiving layer containing white inorganic pigment particles.

(10) A method for improving weather resistance of a color image material formed by using the ink claimed in claim 7.

BEST MODE FOR CARRYING OUT THE INVENTION

The present invention is described in detail below.

(Azo Coloring Matter)

Here, the Hammett's substituent constant σp value as used in the present invention is briefly described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), Lange's Handbook of Chemistry, 12th ed., McGraw-Hill (1979), and Kagakuno Ryoiki (Chemistry Region), special number, No. 122, pp. 96-103, Nankodo (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although the compounds represented by formulae (1) and (3) to (6) of the present invention are not a benzene derivative, the σp value is used as a measure for showing the electron effect of substituent irrespective of the substitution site. In the present invention, the σp value is used in this meaning.

The azo coloring matter for use in the present invention is an azo coloring matter represented by any one of formulae (1) and (3) to (6).

Formula (1) is described in detail below.

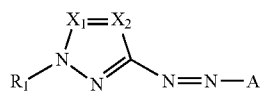

Formula (1)

In formula (1), $R_1$ represents an alkyl group, an alkenyl group, an alkynyl group, an aralkyl group, an aryl group, a heterocyclic group, an acyl group, an alkyloxycarbonyl group, an aryloxycarbonyl group, a carbamoyl group, an alkylsulfonyl group, an arylsulfonyl group or a sulfamoyl group. These groups each may further have a substituent When $R_1$ is a group which can further have a substituent, the group may further have the following substituent.

Examples of the substituent include a linear or branched alkyl group having a carbon number of 1 to 12, a linear or branched aralkyl group having a carbon number of 7 to 18, a linear or branched alkenyl group having a carbon number of 2 to 12, a linear or branched alkynyl group having a carbon number of 2 to 12, a linear or branched cycloalkyl group having a carbon number of 3 to 12, a linear or branched cycloalkenyl group having a carbon number of 3 to 12 (these groups each is preferably a group having a branched chain because the solubility of dye and the stability of ink are enhanced, and a group having an asymmetric carbon is more preferred; e.g., methyl, ethyl, propyl, isopropyl, sec-butyl, tert-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methylsulfonylethoxy), an aryloxy group (e.g., phenoxy, 2-methylphenoxy, 4-tert-butylphenoxy, 3-nitrophenoxy, 3-tert-butyloxycarbonylphenoxy, 3-methoxycarbonylphenyloxy), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an arylamino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), an alkylsulfonylamino or arylsulfonylamino group (e.g., methylsulfonylamino, phenylsulfonylamino, p-toluenesulfonylamino), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methylsulfonyl, octylsulfonyl, phenylsulfonyl, p-toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (for example, a carboxyl group, a sulfo group, a phosphono group and a quaternary ammonium group).

Preferred substituents as $R_1$ in formula (1) are described in detail below.

The alkyl group represented by $R_1$ includes a linear, branched or cyclic, substituted or unsubstituted alkyl group. The total carbon number is preferably from 1 to 30, more preferably from 1 to 12, still more preferably from 1 to 8. Preferred examples of the substituent include a hydroxyl group, an alkoxy group, a cyano group, a halogen atom, a sulfo group (may be in a salt form) and a carboxyl group (may be in a salt form). Examples of the alkyl group include methyl, ethyl, butyl, tert-butyl, n-octyl, eicosyl, 2-chloroethyl, hydroxyethyl, cyanoethyl, 4-sulfobutyl, cyclohexyl, cyclopentyl and 4-n-dodecylcyclohexyl.

The alkenyl group represented by $R_1$ includes a linear, branched or cyclic, substituted or unsubstituted alkenyl group. The total carbon number is preferably from 2 to 30. Examples of the alkenyl group include vinyl, allyl, prenyl, geranyl, oleyl, 2-cyclopenten-1-yl and 2-cyclohexen-1-yl.

The alkynyl group represented by $R_1$ is preferably a substituted or unsubstituted alkynyl group having a total carbon number of 2 to 30. Examples of the alkynyl group include ethynyl and propargyl.

The aralkyl group represented by $R_1$ is preferably a substituted or unsubstituted aralkyl group having a total carbon number of 7 to 30. Examples of the aralkyl group include benzyl and 2-phenethyl.

The aryl group represented by $R_1$ may be a monocyclic ring or a condensed ring and is preferably a substituted or unsubstituted aryl group having a total carbon number of 6 to 30, more preferably a substituted or unsubstituted aryl group having a total carbon number of 6 to 18, still more preferably a substituted or unsubstituted aryl group having a total carbon number of 6 to 12. Examples of the aryl group include phenyl, p-tolyl, naphthyl, m-chlorophenyl, and o-hexadecanoylaminophenyl.

The heterocyclic group represented by $R_1$ is a group having a heteroatom (e.g., nitrogen atom, sulfur atom, oxygen atom) in the ring and may be a non-aromatic (saturated) ring or an aromatic (unsaturated) ring. Also, the heterocyclic ring may be a monocyclic ring or a condensed ring and may be unsubstituted or may have a substituent. The heterocyclic group is preferably a substituted or unsubstituted, aromatic or non-aromatic 5- or 6-membered heterocyclic group, more preferably a 5- or 6-membered aromatic heterocyclic group having a carbon number of 3 to 30. Examples of the heterocyclic group include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and sulfolane.

The acyl group represented by $R_1$ is preferably a formyl group, a substituted or unsubstituted alkylcarbonyl group having a carbon number of 2 to 30, a substituted or unsubstituted arylcarbonyl group having a carbon number of 7 to 30, or a substituted or unsubstituted heterocyclic carbonyl group having a carbon number of 4 to 30, with the carbonyl group being bonded through a carbon atom. Examples of the acyl group include acetyl, pivaloyl, 2-chloroacetyl, stearoyl, benzoyl, p-n-octyloxyphenylcarbonyl, 2-pyridylcarbonyl and 2-furylcarbonyl.

The alkyloxycarbonyl group represented by $R_1$ is preferably a substituted or unsubstituted alkyloxycarbonyl group having a carbon number of 2 to 30. Examples of the alkoxycarbonyl group include methoxycarbonyl, ethoxycarbonyl, tert-butoxycarbonyl and n-octadecyloxycarbonyl.

The aryloxycarbonyl group represented by $R_1$ is preferably a substituted or unsubstituted aryloxycarbonyl group having a carbon number of 7 to 30. Examples of the aryloxycarbonyl group include phenoxycarbonyl, o-chlorophenoxycarbonyl, m-nitrophenoxycarbonyl and p-tert-butylphenoxycarbonyl.

The carbamoyl group represented by $R_1$ is preferably a substituted or unsubstituted carbamoyl group having a carbon number of 1 to 30. Examples of the carbamoyl group include carbamoyl, N-methylcarbamoyl, N,N-dimethylcarbamoyl, N,N-di-n-octylcarbamoyl and N-(methylsulfonyl)carbamoyl.

The alkylsulfonyl group and arylsulfonyl group represented by $R_1$ are preferably a substituted or unsubstituted alkylsulfonyl group having a carbon number of 1 to 30 and a substituted or unsubstituted arylsulfonyl group having a carbon number of 6 to 30. Examples of the alkyl- or aryl-sulfonyl group include methylsulfonyl, phenylsulfonyl and p-toluenesulfonyl.

The sulfamoyl group represented by $R_1$ is preferably a substituted or unsubstituted sulfamoyl group having a carbon number of 0 to 30. Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl and N-(N'-phenylcarbamoyl)sulfamoyl.

In formula (1), $X_1$ represents —$CR_2$= or a nitrogen atom.

When $X_1$ in formula (1) represents —$CR_2$=, preferred substituents as $R_2$ are described in detail below.

When $R_2$ represents a monovalent group, the monovalent group is a hydrogen atom or a monovalent substituent.

The monovalent substituent is described in more detail. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (alkylamino group, arylamino group), an acylamino group (amido group), an aminocarbonylamino group (ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group and an imide group. These groups each may further have a substituent.

Among these, preferred are a hydrogen atom, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group and an alkoxycarbonyl group, more preferred are a hydrogen atom, a halogen atom, an alkyl group, an aryl group, a cyano group, an alkylsulfonyl group, an arylsulfonyl group and a heterocyclic group, and most preferred are a hydrogen atom, an alkyl group, an aryl group, a cyano group and an alkylsulfonyl group.

$R_2$ is described in more detail below.

The halogen atom represented by $R_2$ is a chlorine atom, a bromine atom or an iodine atom, preferably a chlorine atom or a bromine atom, more preferably a chlorine atom.

The alkyl group represented by $R_2$ includes a substituted or unsubstituted alkyl group.

The substituted or unsubstituted alkyl group is preferably an alkyl group having a carbon atom number of 1 to 30. Examples of the substituent are the same as those of the substituent described above when $R_1$ is a group which may further have a substituent.

In particular, a hydroxyl group, an alkoxy group, a cyano group, a halogen atom, a sulfo group (may be in a salt form) and a carboxyl group (may be in a salt form) are preferred. Examples of the alkyl group include methyl, ethyl, butyl, tert-butyl, n-octyl, eicosyl, 2-chloroethyl, hydroxyethyl, cyanoethyl and 4-sulfobutyl.

The cycloalkyl group represented by $R_2$ includes a substituted or unsubstituted cycloalkyl group. The substituted or unsubstituted cycloalkyl group is preferably a cycloalkyl group having a carbon atom number of 5 to 30. Examples of the substituent are the same as those of the substituent described above when $R_1$ is a group which may further have a substituent. Examples of the cycloalkyl group include cyclohexyl, cyclopentyl and 4-n-dodecylcyclohexyl.

The aralkyl group represented by $R_2$ includes a substituted or unsubstituted aralkyl group. The substituted or unsubstituted aralkyl group is preferably an aralkyl group having a carbon atom number of 7 to 30. Examples of the substituent are the same as those of the substituent described above when $R_1$ is a group which may further have a substituent. Examples of the aralkyl group include benzyl and 2-phenethyl.

The alkenyl group represented by $R_2$ indicates a linear, branched or cyclic, substituted or unsubstituted alkenyl group. The alkenyl group is preferably a substituted or unsubstituted alkenyl group having a carbon number of 2 to 30, and examples thereof include vinyl, allyl, prenyl, geranyl, oleyl, 2-cyclopenten-1-yl and 2-cyclohexen-1-yl.

The alkynyl group represented by $R_2$ is a substituted or unsubstituted alkynyl group having a carbon number of 2 to 30, and examples thereof include ethynyl and propargyl.

The aryl group represented by $R_2$ is a substituted or unsubstituted aryl group having a carbon number of 6 to 30, such as phenyl, p-tolyl, naphthyl, m-chlorophenyl and o-hexadecanoylaminophenyl. Examples of the substituent are the same as those of the substituent described above when $R_1$ is a group which may further have a substituent.

The heterocyclic group represented by $R_2$ is a monovalent group derived by removing one hydrogen atom from a substituted or unsubstituted, aromatic or non-aromatic 5- or 6-membered heterocyclic compound, which may be further ring-condensed, preferably a 5- or 6-membered aromatic heterocyclic group having a carbon number of 3 to 30 Examples of the substituent are the same as those of the substituent described above when $R_1$ is a group which may further have a substituent. Examples of the heterocyclic group include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

The alkoxy group represented by $R_2$ includes a substituted or unsubstituted alkoxy group. The substituted or unsubstituted alkoxy group is preferably an alkoxy group having a carbon atom number of 1 to 30. Examples of the substituent are the same as those of the substituent described above when $R_1$ is a group which may further have a substituent. Examples of the alkoxy group include methoxy, ethoxy, isopropoxy, n-octyloxy, methoxyethoxy, hydroxyethoxy and 3-carboxypropoxy.

The aryloxy group represented by $R_2$ is preferably a substituted or unsubstituted aryloxy group having a carbon number of 6 to 30. Examples of the substituent are the same as those of the substituent described above when $R_1$ is a group which may further have a substituent. Examples of the aryloxy group include phenoxy, 2-methylphenoxy, 4-tert-butylphenoxy, 3-nitrophenoxy and 2-tetradecanoylaminophenoxy.

The silyloxy group represented by $R_2$ is preferably a silyloxy group having a carbon number of 3 to 20, and examples thereof include trimethylsilyloxy and tert-butyldimethylsilyloxy.

The heterocyclic oxy group represented by $R_2$ is preferably a substituted or unsubstituted heterocyclic oxy group having a carbon number of 2 to 30. Examples of the substituent are the same as those of the substituent described above when $R_1$ is a group which may further have a substituent. Examples of the heterocyclic oxy group include 1-phenyltetrazol-5-oxy and 2-tetrahydropyranyloxy.

The acyloxy group represented by $R_2$ is preferably a formyloxy group, a substituted or unsubstituted alkylcarbonyloxy group having a carbon number of 2 to 30, or a substituted or unsubstituted arylcarbonyloxy group having a carbon number of 6 to 30. Examples of the substituent are the same as those of the substituent described above when $R_1$ is a group which may further have a substituent. Examples of the acyloxy group include formyloxy, acetyloxy, pivaloyloxy, stearoyloxy, benzoyloxy and p-methoxyphenylcarbonyloxy.

The carbamoyloxy group represented by $R_2$ is preferably a substituted or unsubstituted carbamoyloxy group having a carbon number of 1 to 30. Examples of the substituent are the same as those of the substituent described above when $R_1$ is a group which may further have a substituent. Examples of the carbamoyloxy group include N,N-dimethylcarbamoyloxy, N,N-diethylcarbamoyloxy, morpholinocarbonyloxy, N,N-di-n-octylaminocarbonyloxy and N-n-octylcarbamoyloxy.

The alkoxycarbonyloxy group represented by $R_2$ is preferably a substituted or unsubstituted alkoxycarbonyloxy group having a carbon number of 2 to 30. Examples of the substituent are the same as those of the substituent described above when $R_1$ is a group which may further have a substituent. Examples of the alkoxycarbonyloxy group include methoxycarbonyloxy, ethoxycarbonyloxy, tert-butoxycarbonyloxy and n-octylcarbonyloxy.

The aryloxycarbonyloxy group represented by $R_2$ is preferably a substituted or unsubstituted aryloxycarbonyloxy group having a carbon number of 7 to 30. Examples of the substituent are the same as those of the substituent described above when $R_1$ is a group which may further have a substituent. Examples of the aryloxycarbonyloxy group include phenoxycarbonyloxy, p-methoxyphenoxycarbonyloxy and p-n-hexadecyloxyphenoxycarbonyloxy.

The amino group represented by $R_2$ is preferably a substituted or unsubstituted alkylamino group having a carbon number of 1 to 30 or a substituted or unsubstituted arylamino group having a carbon number of 6 to 30. Examples of the substituent are the same as those of the substituent described above when $R_1$ is a group which may further have a substituent. Examples of the amino group include amino, methylamino, dimethylamino, anilino, N-methylanilino, diphenylamino, hydroxyethylamino, carboxyethylamino, sulfoethylamino and 3,5-dicarboxyanilino.

The acylamino group represented by $R_2$ is preferably a formylamino group, a substituted or unsubstituted alkylcarbonylamino group having a carbon number of 1 to 30, or a substituted or unsubstituted arylcarbonylamino group having a carbon number of 6 to 30. Examples of the substituent are the same as those of the substituent described above when $R_1$ is a group which may further have a substituent. Examples of the acylamino group include formylamino, acetylamino, pivaloylamino, lauroylamino, benzoylamino and 3,4,5-tri-n-octyloxyphenylcarbonylamino.

The aminocarbonylamino group represented by $R_2$ is preferably a substituted or unsubstituted aminocarbonylamino group having a carbon number of 1 to 30. Examples of the substituent are the same as those of the substituent described above when $R_1$ is a group which may further have a substituent. Examples of the aminocarbonylamino group include carbamoylamino, N,N-dimethylaminocarbonylamino, N,N-diethylaminocarbonylamino and morpholinocarbonylamino.

The alkoxycarbonylamino group represented by $R_2$ is preferably a substituted or unsubstituted alkoxycarbonylamino group having a carbon number of 2 to 30. Examples of the substituent are the same as those of the substituent described above when $R_1$ is a group which may further have a substituent. Examples of the alkoxycarbonylamino group include methoxycarbonylamino, ethoxycarbonylamino, tert-butoxycarbonylamino, n-octadecyloxycarbonylamino and N-methylmethoxycarbonylamino.

The aryloxycarbonylamino group represented by $R_2$ is preferably a substituted or unsubstituted aryloxycarbonylamino group having a carbon number of 7 to 30. Examples of the substituent are the same as those of the substituent described above when $R_1$ is a group which may further have a substituent. Examples of the aryloxycarbonylamino group include phenoxycarbonylamino, p-chlorophenoxycarbonylamino and m-n-octyloxyphenoxycarbonylamino.

The sulfamoylamino group represented by $R_2$ is preferably a substituted or unsubstituted sulfamoylamino group having a carbon number of 0 to 30. Examples of the substituent are the same as those of the substituent described above when $R_1$ is a group which may further have a substituent. Examples of the sulfamoylamino group include sulfamoylamino, N,N-dimethylaminosulfonylamino and N-n-octylaminosulfonylamino.

The alkyl- or aryl-sulfonylamino group represented by $R_2$ is preferably a substituted or unsubstituted alkylsulfonylamino group having a carbon number of 1 to 30 or a substituted or unsubstituted arylsulfonylamino group having a carbon number of 6 to 30. Examples of the substituent are the same as those of the substituent described above when $R_1$ is a group which may further have a substituent. Examples of the alkylsulfonylamino group and arylsulfonylamino group include methylsulfonylamino, butylsulfonylamino, phenylsulfonylamino, 2,3,5-trichlorophenylsulfonylamino and p-methylphenylsulfonylamino.

The alkylthio group represented by $R_2$ is preferably a substituted or unsubstituted alkylthio group having a carbon number of 1 to 30. Examples of the substituent are the same as those of the substituent described above when $R_1$ is a group which may further have a substituent. Examples of the alkylthio group include methylthio, ethylthio and n-hexadecylthio.

The arylthio group represented by $R_2$ is preferably a substituted or unsubstituted arylthio group having a carbon number of 6 to 30. Examples of the substituent are the same as those of the substituent described above when $R_1$ is a group which may further have a substituent. Examples of the arylthio group include phenylthio, p-chlorophenylthio and m-methoxyphenylthio.

The heterocyclic thio group represented by $R_2$ is preferably a substituted or unsubstituted heterocyclic thio group having a carbon number of 2 to 30. Examples of the substituent are the same as those of the substituent described above when $R_1$ is a group which may further have a substituent. Examples of the heterocyclic thio group include 2-benzothiazolylthio and 1-phenyltetrazol-5-ylthio.

The sulfamoyl group represented by $R_2$ is preferably a substituted or unsubstituted sulfamoyl group having a carbon number of 0 to 30. Examples of the substituent are the same as those of the substituent described above when $R_1$ is a group which may further have a substituent. Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl, and N-(N'-phenylcarbamoyl)sulfamoyl.

The alkyl- or aryl-sulfinyl group represented by $R_2$ is preferably a substituted or unsubstituted alkylsulfinyl group having a carbon number of 1 to 30 or a substituted or unsubstituted arylsulfinyl group having a carbon number of 6 to 30. Examples of the substituent are the same as those of the substituent described above when $R_1$ is a group which may further have a substituent. Examples of the alkyl- or arylsulfinyl group include methylsulfinyl, ethylsulfinyl, phenylsulfinyl and p-methylphenylsulfinyl.

The alkyl- or aryl-sulfonyl group represented by $R_2$ is preferably a substituted or unsubstituted alkylsulfonyl group having a carbon number of 1 to 30 or a substituted or unsubstituted arylsulfonyl group having a carbon number of 6 to 30. Examples of the substituent are the same as those of the substituent described above when $R_1$ is a group which may further have a substituent. Examples of the alkyl- or arylsulfonyl group include methylsulfonyl, ethylsulfonyl, phenylsulfonyl and p-toluenesulfonyl.

The acyl group represented by $R_2$ is preferably a formyl group, a substituted or unsubstituted alkylcarbonyl group having a carbon number of 2 to 30, a substituted or unsubstituted arylcarbonyl group having a carbon number of 7 to 30, or a substituted or unsubstituted heterocyclic carbonyl group having a carbon number of 4 to 30, with the carbonyl group being bonded through a carbon atom. Examples of the substituent are the same as those of the substituent described above when $R_1$ is a group which may further have a substituent. Examples of the acyl group include acetyl, pivaloyl, 2-chloroacetyl, stearoyl, benzoyl, p-n-octyloxyphenylcarbonyl, 2-pyridylcarbonyl and 2-furylcarbonyl.

The aryloxycarbonyl group represented by $R_2$ is preferably a substituted or unsubstituted aryloxycarbonyl group having a carbon number of 7 to 30. Examples of the substituent are the same as those of the substituent described above when $R_1$ is a group which may further have a substituent. Examples of the aryloxycarbonyl group include phenoxycarbonyl, o-chlorophenoxycarbonyl, m-nitrophenoxycarbonyl, and p-tert-butylphenoxycarbonyl.

The alkoxycarbonyl group represented by $R_2$ is preferably a substituted or unsubstituted alkoxycarbonyl group having a carbon number of 2 to 30. Examples of the substituent are the same as those of the substituent described above when $R_1$ is a group which may further have a substituent. Examples of the alkoxycarbonyl group include methoxycarbonyl, ethoxycarbonyl, tert-butoxycarbonyl and n-octadecyloxycarbonyl.

The carbamoyl group represented by $R_2$ is preferably a substituted or unsubstituted carbamoyl group having a carbon number of 1 to 30. Examples of the substituent are the same as those of the substituent described above when $R_1$ is a group which may further have a substituent. Examples of the carbamoyl group include carbamoyl, N-methylcarbamoyl, N,N-dimethylcarbamoyl, N,N-di-n-octylcarbamoyl and N-(methylsulfonyl)carbamoyl.

The phosphino group represented by $R_2$ is preferably a substituted or unsubstituted phosphino group having a carbon number of 2 to 30. Examples of the substituent are the same as those of the substituent described above when $R_1$ is a group which may further have a substituent. Examples of the phosphino group include dimethylphosphino, diphenylphosphino and methylphenoxyphosphino.

The phosphinyl group represented by $R_2$ is preferably a substituted or unsubstituted phosphinyl group having a carbon number of 2 to 30. Examples of the substituent are the same as those of the substituent described above when $R_1$ is a group which may further have a substituent. Examples of the phosphinyl group include phosphinyl, dioctyloxyphosphinyl and diethoxyphosphinyl.

The phosphinyloxy group represented by $R_2$ is preferably a substituted or unsubstituted phosphinyloxy group having a carbon number of 2 to 30. Examples of the substituent are the same as those of the substituent described above when $R_1$ is a group which may further have a substituent. Examples of the phosphinyloxy group include diphenoxyphosphinyloxy and dioctyloxyphosphinyloxy.

The phosphinylamino group represented by $R_2$ is preferably a substituted or unsubstituted phosphinylamino group having a carbon number of 2 to 30. Examples of the substituent are the same as those of the substituent described above when $R_1$ is a group which may further have a substituent. Examples of the phosphinylamino group include dimethoxyphosphinylamino and dimethylaminophosphinylamino.

The silyl group represented by $R_2$ is preferably a substituted or unsubstituted silyl group having a carbon number of 3 to 30. Examples of the substituent are the same as those of the substituent described above when $R_1$ is a group which may further have a substituent. Examples of the silyl group include trimethylsilyl, tert-butyldimethylsilyl and phenyldimethylsilyl.

Examples of the azo group represented by $R_2$ include phenylazo, 4-methoxyphenylazo, 4-pivaloylaminophenylazo and 2-hydroxy-4-propanoylphenylazo.

Examples of the imido group represented by $R_2$ include N-succinimido and N-phthalimido.

When $R_2$ represents a divalent group, the divalent group is preferably an alkylene group (e.g., methylene, ethylene, propylene, butylene, pentylene), an alkenylene group (e.g., ethenylene, propenylene), an alkynylene group (e.g., ethynylene, propynylene), an arylene group (e.g., phenylene, naphthylene), a divalent heterocyclic group (e.g., 6-chloro-1,3,5-triazine-2,4-diyl, pyrimidine-2,4-diyl, pyrimidine-4,6-diyl, quinoxaline-2,3-diyl, pyridazine-3,6-diyl), —O—, —CO—, —NR'— (wherein R' is a hydrogen atom, an alkyl group or an aryl group), —S—, —SO$_2$—, —SO— or a combination thereof (e.g., —NHCH$_2$CH$_2$NH—, —NHCONH—).

These alkylene group, alkenylene group, alkynylene group, arylene group and divalent heterocyclic group and the alkyl group or aryl group of R each may have a substituent.

Examples of the substituent are the same as those of the substituent described with respect to $R_1$.

The alkyl group and aryl group of R' have the same meanings as those of the substituent $R_1$.

The divalent group is more preferably an alkylene group having a carbon number of 10 or less, an alkenylene group having a carbon number of 10 or less, an alkynylene group having a carbon number of 10 or less, an arylene group having a carbon number of 6 to 10, a divalent heterocyclic group having a carbon number of 6 to 10, —S—, —SO—, —SO$_2$— or a combination thereof (e.g., —SCH$_2$CH$_2$S—, —SCH$_2$CH$_2$CH$_2$S—).

The total carbon number of the divalent linking group is preferably from 0 to 50, more preferably from 0 to 30, and most preferably from 0 to 10.

In the case where $R_2$ represents a trivalent group, the trivalent group is preferably a trivalent hydrocarbon group, a trivalent heterocyclic group, >N— or a combination thereof with a divalent group (e.g., >NCH$_2$CH$_2$NH—, >NCONH—).

The total carbon number of the trivalent linking group is preferably from 0 to 50, more preferably from 0 to 30, and most preferably from 0 to 10.

$X_1$ in formula (1) is preferably a —CR$_2$= group where $R_2$ is a hydrogen atom, an alkyl group, an aryl group, a cyano group, an alkylsulfonyl group having a carbon number of 1 to 12, an arylsulfonyl group having a carbon number of 6 to 18 or a sulfamoyl group having a carbon number of 0 to 12, or a nitrogen atom, more preferably a —CR$_2$= group where $R_3$ is a hydrogen atom, an alkyl group, an aryl group, a cyano group, an alkylsulfonyl group having a carbon number of 1 to 12 or a sulfamoyl group having a carbon number of 0 to 12, or a nitrogen atom, still more preferably a —CR$_2$= group where $R_2$ is a hydrogen atom, an alkyl group, an aryl group, a cyano group or an alkylsulfonyl group having a carbon number of 1 to 12, or a nitrogen atom, and most preferably a —CR$_2$= group where $R_2$ is a hydrogen atom or an alkyl group.

$X_2$ represents —CR$_3$= or a nitrogen atom.

When $X_2$ represents —CR$_3$=, preferred substituents as $R_2$ are described in detail below.

$R_3$ represents a hydrogen atom or a substituent. When $R_3$ represents a substituent, the substituent may further have a substituent.

When X in formula (1) represents —CR$_3$=, preferred substituents as $R_3$ are described in detail below.

$R_3$ represents a hydrogen atom or a substituent.

In the case where $R_3$ represents a substituent, $R_3$ in formula (1) is preferably an electron-withdrawing group having a Hammett's substituent constant σp value of 0.20 or more, more preferably an electron-withdrawing group having a σp value of 0.30 or more, with the upper limit being 1.0 or less.

Specific examples of $R_3$ which is an electron-withdrawing group having a σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing groups having a σp value of 0.20 or more, a heterocyclic group, a halogen atom, an azo group and a selenocyanate group.

Preferred examples of $R_3$ include an acyl group having a carbon number of 2 to 12, an acyloxy group having a carbon number of 2 to 12, a carbamoyl group having a carbon number of 1 to 12, an alkyloxycarbonyl group having a carbon number of 2 to 12, an aryloxycarbonyl group having a carbon number of 7 to 18, a cyano group, a nitro group, an alkylsulfinyl group having a carbon number of 1 to 12, an arylsulfinyl group having a carbon number of 6 to 18, an alkylsulfonyl group having a carbon number of 1 to 12, an arylsulfonyl group having a carbon number of 6 to 18, a sulfamoyl group having a carbon number of 0 to 12, a halogenated alkyl group having a carbon number of 1 to 12, a halogenated alkyloxy group having a carbon number of 1 to 12, a halogenated alkylthio group having a carbon number of 1 to 12, a halogenated aryloxy group having a carbon number of 7 to 18, an aryl group having a carbon number of 7 to 18 and being substituted by two or more other electron-withdrawing groups each having a σp value of 0.20 or more, and a 5- to 8-membered heterocyclic group containing a nitrogen atom, an oxygen atom or a sulfur atom and having a carbon number of 1 to 18.

Among these, more preferred are a cyano group, an alkylsulfonyl group having a carbon number of 1 to 12, an arylsulfonyl group having a carbon number of 6 to 18, and a sulfamoyl group having a carbon number of 0 to 12.

$R_3$ is preferably a cyano group, an alkylsulfonyl group having a carbon number of 1 to 12 or a sulfamoyl group having a carbon number of 0 to 12, and most preferably a cyano group or an alkylsulfonyl group having a carbon number of 1 to 12.

$X_2$ in formula (1) is preferably a —CR$_3$= group where $R_3$ is a cyano group, an alkylsulfonyl group having a carbon number of 1 to 12, an arylsulfonyl group having a carbon number of 6 to 18 or a sulfamoyl group having a carbon number of 0 to 12, or a nitrogen atom, more preferably a —CR$_3$= group where $R_3$ is a cyano group, an alkylsulfonyl group having a carbon number of 1 to 12 or a sulfamoyl group having a carbon number of 0 to 12, or a nitrogen atom, still more preferably a —CR$_3$= group where $R_3$ is a cyano group or an alkylsulfonyl group having a carbon number of 1 to 12, or a nitrogen atom, and most preferably a —CR$_3$= group where $R_3$ is a cyano group.

A represents any one group selected from the monovalent substituent groups in the following formula (2), which may have a substituent:

Formula (2)

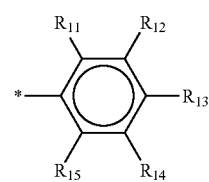

(A-1)

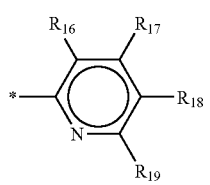  (A-2)
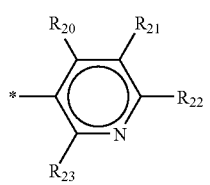  (A-3)
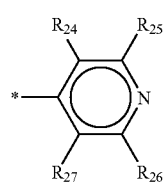  (A-4)
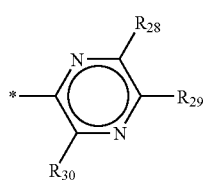  (A-5)
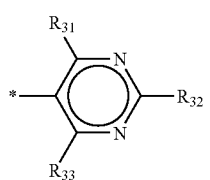  (A-6)
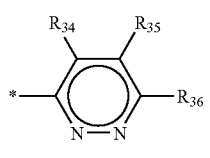  (A-7)
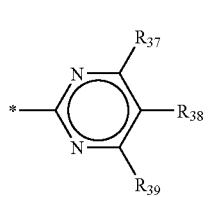  (A-8)
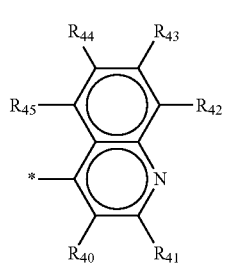  (A-9)
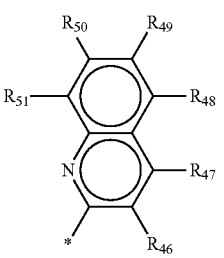  (A-10)
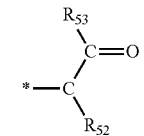  (A-11)
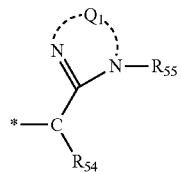  (A-12)
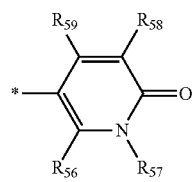  (A-13)
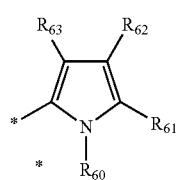  (A-14)
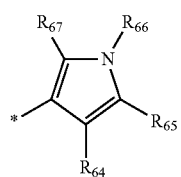  (A-15)
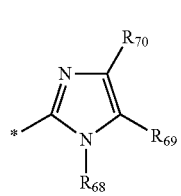  (A-16)
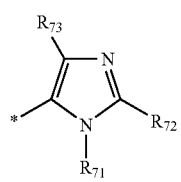  (A-17)

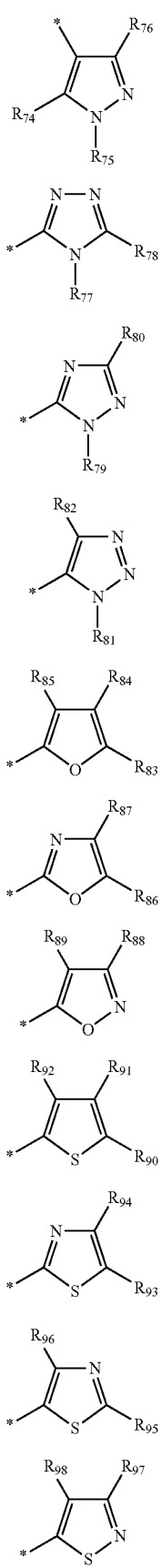
(A-18)
(A-19)
(A-20)
(A-21)
(A-22)
(A-23)
(A-24)
(A-25)
(A-26)
(A-27)
(A-28)
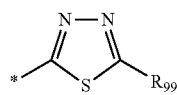 (A-29)
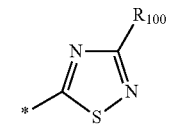 (A-30)
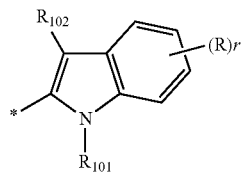 (A-31)
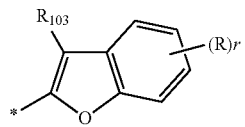 (A-32)
(A-33)
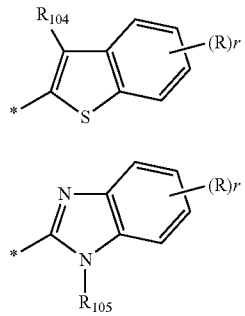
(A-34)
(A-35)
(A-36)
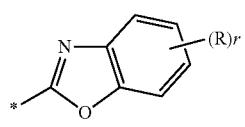 (A-37)
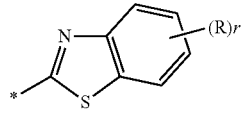 
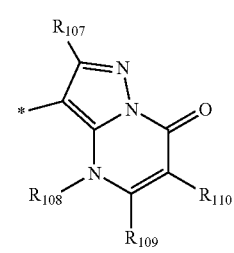 (A-38)

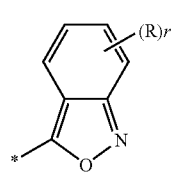
(A-39)

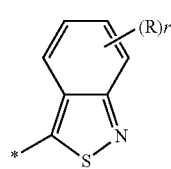
(A-40)

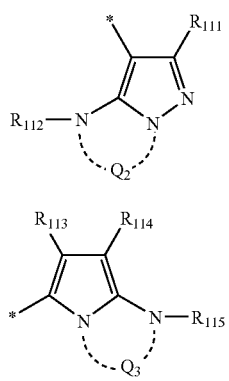
(A-41)

(A-42)

In the monovalent substituent groups (A-1) to (A-42) represented by formula (2), $R_{11}$ to $R_{15}$ each independently represents a hydrogen atom or a substituent.

This substituent has the same meaning as the group described above with respect to the substituent $R_2$.

$Q_1$ in (A-12), $Q_2$ in (A-41) and $Q_3$ in (A-42) each represents a nonmetallic atom group necessary for forming a 5- to 7-membered hydrocarbon or heterocyclic ring together with the nitrogen atom.

R represents a substituent.

This substituent has the same meaning as the group described above with respect to the substituent $R_2$.

r represents an integer of 0 to 4.

When a plurality of substituents R are present, each R's may be independently the same or different.

A pair of $R_1$ and $R_2$ when $X_1$ represents —$CR_2$=, and/or a pair of $R_2$ and $R_3$ when $X_2$ represents —$CR_3$=, each may combine to form a 5- to 7-membered ring.

The coloring matter may form a dimer or a trimer through $R_1$, $R_2$, $R_3$ or A.

With respect to the preferred embodiment of the coloring matter represented by formula (1), the range from monomer to multimer is not limited but is preferably from monomer to trimer, more preferably from monomer to dimer, and a dimer is most preferred.

Formula (3) is described in detail below.

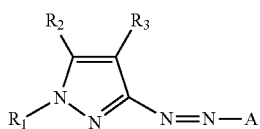
Formula (3)

In formulae (3), $R_1$, $R_2$ and $R_3$ have the same meanings as $R_1$, $R_2$ and $R_3$ in formula (1), and preferred examples thereof are also the same.

In formula (3), A represents any one group selected from the monovalent substituent groups in formula (2), which may have a substituent. Among these, preferred are (A-3), (A-5), (A-6), (A-7), (A-18), (A-27), (A-41) and (A-42), more preferred are (A-3), (A-6), (A-18), (A-27) and (A-41), still more preferred are (A-3), (A-6), (A-18) and (A-41), and most preferred are (A-3), (A-6) and (A-41).

As for the preferred combination of substituents in the coloring matter represented by formula (3) of the present invention, a compound where at least one of various substituents is the above-described preferred group is preferred, a compound where a larger number of various substituents are the above-described preferred groups is more preferred, and a compound where all substituents are the above-described preferred groups is most preferred.

The combination particularly preferred as the coloring matter represented by formula (3) of the present invention is a combination containing the following (i) to (iv).

(i) $R_1$ is preferably a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted acyl group, a substituted or unsubstituted alkyloxycarbonyl group, a substituted or unsubstituted aryloxycarbonyl group, a substituted or unsubstituted carbamoyl group, a substituted or unsubstituted alkylsulfonyl group, a substituted or unsubstituted arylsulfonyl group, or a substituted or unsubstituted sulfamoyl group, more preferably a substituted alkyl group, a substituted alkenyl group, a substituted alkynyl group, a substituted aralkyl group, a substituted aryl group or a substituted heterocyclic group, still more preferably a substituted alkyl group, a substituted aryl group or a substituted heterocyclic group, still even more preferably a substituted aryl group or a substituted heterocyclic group, and most preferably a heterocyclic group having an ionic hydrophilic group as a substituent.

(ii) $R_2$ is preferably a hydrogen atom, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group or an alkoxycarbonyl group, more preferably a hydrogen atom, a halogen atom, an alkyl group, an aryl group, a cyano group, an alkylsulfonyl group, an arylsulfonyl group or a heterocyclic group, still more preferably a hydrogen atom, an alkyl group, an aryl group, a cyano group or an alkylsulfonyl group, and most preferably a hydrogen atom or an alkyl group (e.g., methyl, ethyl).

(iii) $R_3$ is preferably an acyl group having a carbon number of 2 to 12, an acyloxy group having a carbon number of 2 to 12, a carbamoyl group having a carbon number of 1 to 12, an alkyloxycarbonyl group having a carbon number of 2 to 12, an aryloxycarbonyl group having a carbon number of 7 to 18, a cyano group, a nitro group, an alkylsulfinyl group having a carbon number of 1 to 12, an arylsulfinyl group having a carbon number of 6 to 18, an alkylsulfonyl group having a carbon number of 1 to 12, an arylsulfonyl group having a carbon number of 6 to 18, a sulfamoyl group having a carbon number of 0 to 12, a halogenated alkyl group having a carbon number of 1 to 12, a halogenated alkyloxy group having a carbon number of 1 to 12, a halogenated alkylthio group having a carbon number of 1 to 12, a halogenated aryloxy group having a carbon number of 7 to 18, an aryl group having a carbon number of 7 to 18 and being substituted by two or more other electron-withdrawing groups each having a cm value of 0.20 or more, or a 5- to 8-membered heterocyclic group containing a nitrogen atom, an oxygen atom or a sulfur atom and having a carbon number of 1 to 18, more preferably a cyano group, an alkylsulfonyl group having a carbon number of 1 to 12, an arylsulfonyl group having a carbon number of 6 to 18 or a sulfamoyl group having a carbon number of 0 to 12, still more preferably a cyano group, an alkylsulfonyl group having a carbon number of 1 to 12 or a sulfamoyl group having a carbon number of 0 to 12, still even more preferably a cyano group or an alkylsulfonyl group having a carbon number of 1 to 12, and most preferably a cyano group.

(iv) A is preferably any one group selected from the monovalent substituent groups in formula (2), which may have a substituent, more preferably (A-3), (A-5), (A-6), (A-7), (A-18), (A-27), (A-41) or (A-42), still more preferably (A-3), (A-6), (A-18), (A-27) or (A-41), still even more preferably (A-3), (A-6), (A-18) or (A-41), and most preferably (A-3), (A-6) or (A-41).

Formula (4) is described in detail below.

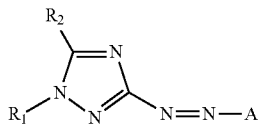

Formula (4)

In formula (4), $R_1$ and $R_2$ have the same meanings as $R_1$ and $R_2$ in formula (1), and preferred examples thereof are also the same.

In formula (4), A represents any one group selected from the monovalent substituent groups in formula (2), which may have a substituent. Among these, preferred are (A-3), (A-5), (A-6), (A-7), (A-18), (A-27), (A-41) and (A-42), more preferred are (A-3), (A-6), (A-18), (A-27) and (A-41), still more preferred are (A-3), (A-6), (A-18) and (A-41), and most preferred are (A-3), (A-6) and (A-41).

As for the preferred combination of substituents in the coloring matter represented by formula (4) of the present invention, a compound where at least one of various substituents is the above-described preferred group is preferred, a compound where a larger number of various substituents are the above-described preferred groups is more preferred, and a compound where all substituents are the above-described preferred groups is most preferred.

The combination particularly preferred as the coloring matter represented by formula (4) of the present invention is a combination containing the following (i) to (iii).

(i) $R_1$ is preferably a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted acyl group, a substituted or unsubstituted alkyloxycarbonyl group, a substituted or unsubstituted aryloxycarbonyl group, a substituted or unsubstituted carbamoyl group, a substituted or unsubstituted alkylsulfonyl group, a substituted or unsubstituted arylsulfonyl group or a substituted or unsubstituted sulfamoyl group, more preferably a substituted alkyl group, a substituted alkenyl group, a substituted alkynyl group, a substituted aralkyl group, a substituted aryl group or a substituted heterocyclic group, still more preferably a substituted alkyl group, a substituted aryl group or a substituted heterocyclic group, still even more preferably a substituted aryl group or a substituted heterocyclic group, and most preferably a heterocyclic group having an ionic hydrophilic group as a substituent.

(ii) $R_2$ is preferably a hydrogen atom, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group or an alkoxycarbonyl group, more preferably a hydrogen atom, a halogen atom, an alkyl group, an aryl group, a cyano group, an alkylsulfonyl group, an arylsulfonyl group or a heterocyclic group, still more preferably a compound where all substituents are the above-described preferred groups is most preferred.

The combination particularly preferred as the coloring matter represented by formula (5) of the present invention is a combination containing the following (i) to (iii).

(i) $R_1$ is preferably a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted acyl group, a substituted or unsubstituted alkyloxycarbonyl group, a substituted or unsubstituted aryloxycarbonyl group, a substituted or unsubstituted carbamoyl group, a substituted or unsubstituted alkylsulfonyl group, a substituted or unsubstituted arylsulfonyl group or a substituted or unsubstituted sulfamoyl group, more preferably a substituted alkyl group, a substituted alkenyl group, a substituted alkynyl group, a substituted aralkyl group, a substituted aryl group or a substituted heterocyclic group, still more preferably a substituted alkyl group, a substituted aryl group or a substituted heterocyclic group, still even more preferably a substituted aryl group or a substituted heterocyclic group, and most preferably an aryl group having an ionic hydrophilic group as a substituent.

(ii) $R_3$ is preferably an acyl group having a carbon number of 2 to 12, an acyloxy group having a carbon number of 2 to 12, a carbamoyl group having a carbon number of 1 to 12, an alkyloxycarbonyl group having a carbon number of 2 to 12, an aryloxycarbonyl group having a carbon number of 7 to 18, a cyano group, a nitro group, an alkylsulfinyl group having a carbon number of 1 to 12, an arylsulfinyl group having a carbon number of 6 to 18, an alkylsulfonyl group having a carbon number of 1 to 12, an arylsulfonyl group having a carbon number of 6 to 18, a sulfamoyl group having a carbon number of 0 to 12, a halogenated alkyl group having a carbon number of 1 to 12, a halogenated alkyloxy group having a carbon number of 1 to 12, a halogenated alkylthio group having a carbon number of 1 to 12, a halogenated aryloxy group having a carbon number of 7 to 18, an aryl group having a carbon number of 7 to 18 and being substituted by two or more other electron-withdrawing hydrogen atom, an alkyl group, an aryl group, a cyano group or an alkylsulfonyl group, still even more preferably a hydrogen atom or an alkyl group, and most preferably a hydrogen atom.

(iii) A is preferably any one group selected from the monovalent substituent groups in formula (2), which may have a substituent, more preferably (A-3), (A-5), (A-6), (A-7), (A-18), (A-27), (A-41) or (A-42), still more preferably (A-3), (A-6), (A-18), (A-27) or (A-41), still even more preferably (A-3), (A-6), (A-18) or (A-41), and most preferably (A-3), (A-6) or (A-41).

Formula (5) is described in detail below.

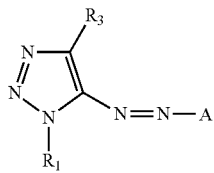

Formula (5)

In formula (5), $R_1$ and $R_3$ have the same meanings as $R_1$ and $R_3$ in formula (1), and preferred examples thereof are also the same.

In formula (5), A represents any one group selected from the monovalent substituent groups in formula (2), which may have a substituent. Among these, preferred are (A-3), (A-5), (A-6), (A-7), (A-18), (A-27), (A-41) and (A-42), more preferred are (A-3), (A-6), (A-18), (A-27) and (A-41), still more preferred are (A-3), (A-6), (A-18) and (A-41), still even more preferred are (A-18) and (A-41), and most preferred is (A-18).

As for the preferred combination of substituents in the coloring matter represented by formula (5) of the present invention, a compound where at least one of various substituents is the above-described preferred group is preferred, a compound where a larger number of various substituents are the above-described preferred groups is more preferred, and a groups each having a σp value of 0.20 or more, or a 5- to 8-membered heterocyclic group containing a nitrogen atom, an oxygen atom or a sulfur atom and having a carbon number of 1 to 18, more preferably a cyano group, an alkylsulfonyl group having a carbon number of 1 to 12, an arylsulfonyl group having a carbon number of 6 to 18 or a sulfamoyl group having a carbon number of 0 to 12, still more preferably a cyano group, an alkylsulfonyl group having a carbon number of 1 to 12 or a sulfamoyl group having a carbon number of 0 to 12, still even more preferably a cyano group or an alkylsulfonyl group having a carbon number of 1 to 12, and most preferably a cyano group.

(iii) A is preferably any one group selected from the monovalent substituent groups in formula (2), which may have a substituent, more preferably (A-3), (A-5), (A-6), (A-7), (A-18), (A-27), (A-41) or (A-42), still more preferably (A-3), (A-6), (A-18), (A-27) or (A-41), still even more preferably (A-3), (A-6), (A-18) or (A-41), yet still even more preferably (A-18) or (A-41), and most preferably (A-18).

Formula (6) is described in detail below.

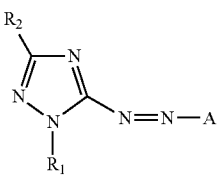

Formula (6)

In formula (6), $R_1$ and $R_2$ have the same meanings as $R_1$ and $R_2$ in formula (1), and preferred examples thereof are also the same.

In formula (6), A represents any one group selected from the monovalent substituent groups in formula (2), which may have a substituent. Among these, preferred are (A-3), (A-5), (A-6), (A-7), (A-18), (A-27), (A-41) and (A-42), more preferred are (A-3), (A-6), (A-18), (A-27) and (A-41), still more preferred are (A-3), (A-6), (A-18) and (A-41), still even more preferred are (A-18) and (A-41), and most preferred is (A-18).

As for the preferred combination of substituents in the coloring matter represented by formula (6) of the present invention, a compound where at least one of various substituents is the above-described preferred group is preferred, a compound where a larger number of various substituents are the above-described preferred groups is more preferred, and a compound where all substituents are the above-described preferred groups is most preferred.

The combination particularly preferred as the coloring matter represented by formula (6) of the present invention is a combination containing the following (i) to (iii).

(i) $R_1$ is preferably a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted acyl group, a substituted or unsubstituted alkyloxycarbonyl group, a substituted or unsubstituted aryloxycarbonyl group, a substituted or unsubstituted carbamoyl group, a substituted or unsubstituted alkylsulfonyl group, a substituted or unsubstituted arylsulfonyl group or a substituted or unsubstituted sulfamoyl group, more preferably a substituted alkyl group, a substituted alkenyl group, a substituted alkynyl group, a substituted aralkyl group, a substituted aryl group or a substituted heterocyclic group, still more preferably a substituted alkyl group, a substituted aryl group or a substituted heterocyclic group, still even more preferably a substituted aryl group or a substituted heterocyclic group, and most preferably an aryl group having an ionic hydrophilic group as a substituent.

(ii) $R_2$ is preferably a hydrogen atom, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group, an alkylthio group or an alkoxycarbonyl group, more preferably a hydrogen atom, a halogen atom, an alkyl group, an aryl group, a cyano group, an alkylsulfonyl group, an arylsulfonyl group, an alkylthio group or a heterocyclic group, still more preferably a hydrogen atom, an alkyl group, an aryl group, a cyano group, an alkylthio group or an alkylsulfonyl group, and most preferably an alkylthio group.

(iii) A is preferably any one group selected from the monovalent substituent groups in formula (2), which may have a substituent, more preferably (A-3), (A-5), (A-6), (A-7), (A-18), (A-27), (A-41) or (A-42), still more preferably (A-3), (A-6), (A-18), (A-27) or (A-41), still even more preferably (A-3), (A-6), (A-18) or (A-41), yet still even more preferably (A-18) or (A-41), and most preferably (A-18).

Among the coloring matters represented by formula (1), in view of the effects of the present invention, a coloring matter represented by the following formula (2-1) is preferred.

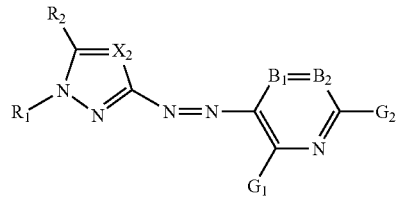

In formula (2-1), $R_1$, $R_2$ and $X_2$ have the same meanings as $R_1$, $R_2$ and $X_2$ in formula (1), and preferred examples thereof are also the same.

In formula (2-1), $B_1$ represents —$CR_4$= or a nitrogen atom, $B_2$ represents —$CR_5$= or a nitrogen atom, and $B_1$ and $B_2$ are not a nitrogen atom at the same time. $R_4$ and $R_5$ each represents a hydrogen atom or a substituent. In formula (2-1), a pair of $R_1$ and $R_2$, a pair of $R_2$ and $R_3$ when $X_2$ represents —$CR_3$=, a pair of $R_4$ and $R_5$ when $B_1$ represents —$CR_4$= and $B_2$ represents —$CR_5$=, and a pair of $R_5$ and $G_2$ when $B_2$ represents —$CR_5$=, each may combine to form a 5- to 7-membered ring.

The substituent represented by $R_4$ and $R_5$ has the same meaning as the substituent described above when $R_1$ in formula (1) is a group which may further have a substituent, and may be sufficient if it is a substitutable group.

From the standpoint that the effects of the present invention can be more effectively produced, $R_4$ and $R_5$ each preferably represents a hydrogen atom, an alkyl group, an alkenyl group, an alkynyl group, an aralkyl group, an aryl group, a heterocyclic group, an acyl group, an acylamino group, an alkyloxy group, an alkyloxycarbonyl group, a carbamoyl group, a sulfamoyl group, an alkylsulfonamido group, an arylsulfonamido group, an amino group, an alkylamino group, an arylamino group, a heterocyclic amino group, a hydroxy group, a cyano group, a sulfo group or a carboxyl group, more preferably a hydrogen atom, an alkyl group, an alkenyl group, an alkynyl group, an alkylamino group, an arylamino group, a heterocyclic amino group, an aralkyl group or a cyano group.

In formula (2-1), a compound where $B_1$ represents —$CR_4$= and $B_2$ represents —$CR_5$= or a nitrogen atom is preferred, and a compound where $B_1$ represents —$CR_4$= and $B_2$ represents —$CR_5$= or where $B_1$ represents —$CR_4$= and $B_2$ represents a nitrogen atom is more preferred.

When $B_1$ represents —$CR_4$= and $B_2$ represents —$CR_5$=, a compound where $R_4$ represents an alkyl group, an alkenyl group, an alkynyl group or an aralkyl group is preferred, a compound where $R_4$ represents an alkyl group and $R_5$ represents a hydrogen atom or a cyano group is more preferred, and a compound where $R_4$ represents an alkyl group and $R_5$ represents a cyano group is most preferred.

When $B_1$ represents —$CR_4$= and $B_2$ represents a nitrogen atom, a compound where $R_4$ represents an alkylamino group, an arylamino group or a heterocyclic amino group is preferred, a compound where $R_4$ represents an alkylamino group or an aryl amino group is more preferred, and a compound where $R_4$ represents an alkylamino group is most preferred.

In formula (2-1), $G_1$ and $G_2$ each independently represents a hydrogen atom or a substituent. The substituent represented by $G_1$ and $G_2$ has the same meaning as the substituent described above when $R_1$ in formula (1) is a group which may further have a substituent, and may be sufficient if it is a substitutable group.

From the standpoint that the effects of the present invention can be more effectively produced, $G_1$ and $G_2$ each preferably represents a hydrogen atom, an alkyl group, an aryl group, a heterocyclic group, an acyloxy group, an acylamino group, an alkyloxy group, an aryloxy group, a heterocyclic oxy group, an alkylsulfonamido group, an arylsulfonamido group, a heterocyclic sulfonamido group, an amino group, an alkylamino group, an arylamino group, a heterocyclic amino group, an alkyloxycarbonylamino group, an aryloxycarbonylamino group, a heterocyclic oxycarbonylamino group, an alkylthio group, an arylthio group, a hydroxy group, a cyano group, a sulfo group, a carboxyl group, a carbamoylamino group, a sulfamoylamino group or a halogen atom, more preferably a hydrogen atom, an alkyl group, a heterocyclic group, an acylamino group, an alkyloxy group, an aryloxy group, an alkylsulfonamido group, an arylsulfonamido group, an alkylamino group, an arylamino group, a heterocyclic amino group, an alkylthio group, an arylthio group or a halogen atom, and most preferably an alkyloxy group, an alkylamino group, an arylamino group or an alkylthio group. Furthermore, an embodiment where both of $G_1$ and $G_2$ each independently represents an alkylamino group, an arylamino group or a heterocyclic amino group is preferred.

A pair of $R_1$ and $R_2$, a pair of $R_2$ and $R_3$, a pair of $R_4$ and $R_5$, and a pair of $R_5$ and $G_2$ each may combine to form a 5- to 7-membered ring (which may be an aromatic ring or a non-aromatic group and may be a carbocyclic ring or a heterocyclic ring, for example, a benzene ring or a pyridine ring).

In the present invention, the coloring matter (azo dye) represented by the following formula (3-1) or (3-2) is more preferred.

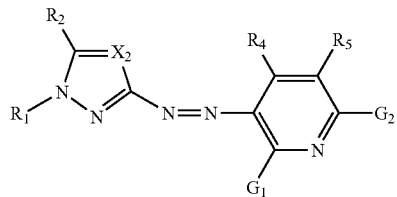

In formula (3-1), $R_1$, $R_2$, $R_4$, $R_5$, $X_2$, $G_1$ and $G_2$ have the same meanings as $R_1$, $R_2$, $R_4$, $R_5$, $X_2$, $G_1$ and $G_2$ in formula (2-1), and preferred examples thereof are also the same.

In formula (3-1), from the standpoint that the effects of the present invention can be more effectively produced, a compound where $R_1$ represents an alkyl group, an aryl group or a heterocyclic group, $R_2$ represents a hydrogen atom, an alkyl group, an aryl group, an acyloxy group, an alkyloxy group, an alkylsulfonyloxy group, an arylsulfonyloxy group, a hydroxy group or a cyano group, $X_2$ represents —$CR_3$=, $R_3$ represents an acyl group, an alkyloxycarbonyl group, an alkylsulfonyl group, an arylsulfonyl group, a cyano group or a carboxyl group, $R_4$ and $R_5$ each independently represents a hydrogen atom, an alkyl group or a cyano group, and $G_1$ and $G_2$ each independently represents a hydrogen atom, an alkyl group, a heterocyclic group, an acylamino group, an alkyloxy group, an aryloxy group, an alkylsulfonamido group, an arylsulfonamido group, an alkylamino group, an arylamino group, a heterocyclic amino group, an alkylthio group, an arylthio group, a hydroxy group or a halogen atom is preferred, and a compound where $R_1$ represents an aryl group or a heterocyclic group, $R_2$ represents a hydrogen atom or an alkyl group, $R_3$ represents an alkyloxycarbonyl group, an alkylsulfonyl group or a cyano group, $R_4$ represents an alkyl group, $R_5$ represents a hydrogen atom or a cyano group, and $G_1$ and $G_2$ each independently represents an alkyloxy group, an alkylamino group, an arylamino group, a heterocyclic amino group or an alkylthio group is most preferred.

As for the preferred combination of substituents in the coloring matter represented by formula (3-1) of the present invention, a compound where at least one of various substituents is the above-described preferred group is preferred, a compound where a larger number of various substituents are the above-described preferred groups is more preferred, and a compound where all substituents are the above-described preferred groups is most preferred.

The combination particularly preferred as the coloring matter represented by formula (3-1) of the present invention is a combination containing the following (i) to (vii).

(i) $R_1$ is preferably a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted acyl group, a substituted or unsubstituted alkyloxycarbonyl group, a substituted or unsubstituted aryloxycarbonyl group, a substituted or unsubstituted carbamoyl group, a substituted or unsubstituted alkylsulfonyl group, a substituted or unsubstituted arylsulfonyl group, or a substituted or unsubstituted sulfamoyl group, more preferably a substituted alkyl group, a substituted alkenyl group, a substituted alkynyl group, a substituted aralkyl group, a substituted aryl group or a substituted heterocyclic group, still more preferably a substituted alkyl group, a substituted aryl group or a substituted heterocyclic group, still even more preferably a substituted aryl group or a substituted heterocyclic group, and most preferably an aryl group having an ionic hydrophilic group as a substituent or a heterocyclic group having an ionic hydrophilic group as a substituent.

(ii) $R_2$ is preferably a hydrogen atom, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group or an alkoxycarbonyl group, more preferably a hydrogen atom, a halogen atom, an alkyl group, an aryl group, a cyano group, an alkylsulfonyl group, an arylsulfonyl group or a heterocyclic group, still more preferably a hydrogen atom, an alkyl group, an aryl group, a cyano group or an alkylsulfonyl group, and most preferably a hydrogen atom or an alkyl group.

(iii) $X_2$ is preferably $-CR_3=$ or a nitrogen atom, more preferably $-CR_3=$.

(iv) $R_3$ is preferably an acyl group having a carbon number of 2 to 12, an acyloxy group having a carbon number of 2 to 12, a carbamoyl group having a carbon number of 1 to 12, an alkyloxycarbonyl group having a carbon number of 2 to 12, an aryloxycarbonyl group having a carbon number of 7 to 18, a cyano group, a nitro group, an alkylsulfinyl group having a carbon number of 1 to 12, an arylsulfinyl group having a carbon number of 6 to 18, an alkylsulfonyl group having a carbon number of 1 to 12, an arylsulfonyl group having a carbon number of 6 to 18, a sulfamoyl group having a carbon number of 0 to 12, a halogenated alkyl group having a carbon number of 1 to 12, a halogenated alkyloxy group having a carbon number of 1 to 12, a halogenated alkylthio group having a carbon number of 1 to 12, a halogenated aryloxy group having a carbon number of 7 to 18, an aryl group having a carbon number of 7 to 18 and being substituted by two or more other electron-withdrawing groups each having a σp value of 0.20 or more, or a 5- to 8-membered heterocyclic group containing a nitrogen atom, an oxygen atom or a sulfur atom and having a carbon number of 1 to 18, more preferably a cyano group, an alkylsulfonyl group having a carbon number of 1 to 12, an arylsulfonyl group having a carbon number of 6 to 18 or a sulfamoyl group having a carbon number of 0 to 12, still more preferably a cyano group, an alkylsulfonyl group having a carbon number of 1 to 12 or a sulfamoyl group having a carbon number of 0 to 12, still even more preferably a cyano group or an alkylsulfonyl group having a carbon number of 1 to 12, and most preferably a cyano group.

(v) $R_4$ is preferably a hydrogen atom, an alkyl group, an alkenyl group, an alkynyl group, an aralkyl group, an aryl group, a heterocyclic group, an acyl group, an acylamino group, an alkyloxy group, an alkyloxycarbonyl group, a carbamoyl group, a sulfamoyl group, an alkylsulfonamido group, an arylsulfonamido group, an amino group, an alkylamino group, an arylamino group, a heterocyclic amino group, a hydroxy group, a cyano group, a sulfo group or a carboxyl group, more preferably a hydrogen atom, an alkyl group, an alkenyl group, an alkynyl group, an aralkyl group, an aryl group, an alkylamino group, an arylamino group or a heterocyclic amino group, still more preferably a hydrogen atom, an alkyl group, an alkenyl group, an alkynyl group, an aralkyl group, an alkylamino group, an arylamino group or a heterocyclic amino group, still even more preferably a hydrogen atom, an alkyl group, an alkylamino group, an arylamino group or a heterocyclic amino group, and most preferably an alkyl group or an alkylamino group.

(vi) $R_5$ is preferably a hydrogen atom, an alkyl group, an alkenyl group, an alkynyl group, an aralkyl group, an aryl group, a heterocyclic group, an acyl group, an acylamino group, an alkyloxy group, an alkyloxycarbonyl group, a carbamoyl group, a sulfamoyl group, an alkylsulfonamido group, an arylsulfonamido group, an amino group, an alkylamino group, a hydroxy group, a cyano group, a sulfo group or a carboxyl group, more preferably an alkyloxycarbonyl group, a carbamoyl group, a sulfamoyl group, a cyano group or a carboxyl group, still more preferably an alkyloxycarbonyl group, a carbamoyl group, a cyano group or a carboxyl group, still even more preferably a carbamoyl group, a cyano group or a carboxyl group, and most preferably a cyano group.

(vii) $G_1$ and $G_2$ each is, independently, preferably a hydrogen atom, an alkyl group, a heterocyclic group, an acylamino group, an alkyloxy group, an aryloxy group, an alkylsulfonamido group, an arylsulfonamido group, an alkylamino group, an arylamino group, a heterocyclic amino group, an alkylthio group, an arylthio group, a hydroxy group or a halogen atom, more preferably an alkylamino group, an arylamino group or a heterocyclic amino group, still more preferably an arylamino group or a heterocyclic amino group. Most preferably, $G_1$ and $G_2$ each is independently an arylamino group having an ionic hydrophilic group.

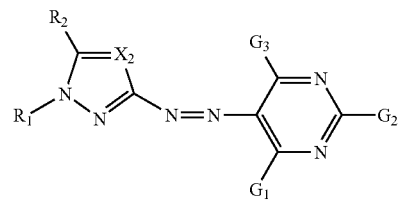

In formula (3-2), $R_1$, $R_2$, $X_2$, $G_1$ and $G_2$ have the same meanings as $R_1$, $R_2$, $X_2$, $G_1$ and $G_2$ in formula (2-1), and preferred examples thereof are also the same.

In formula (3-2), $G_3$ has the same meaning as $G_1$ and $G_2$ in formula (2-1), and preferred examples thereof are also the same.

In formula (3-2), from the standpoint that the effects of the present invention can be more effectively produced, a compound where $R_1$ represents an alkyl group, an aryl group or a heterocyclic group, $R_2$ represents a hydrogen atom, an alkyl group, an aryl group, an acyloxy group, an alkyloxy group, an alkylsulfonyloxy group, an arylsulfonyloxy group, a hydroxy group or a cyano group, $X_2$ represents $-CR_3=$, $R_3$ represents an acyl group, an alkyloxycarbonyl group, an alkylsulfonyl group, an arylsulfonyl group, a cyano group or a carboxyl group, and $G_1$, $G_2$ and $G_3$ each independently represents a hydrogen atom, an alkyl group, a heterocyclic group, an acylamino group, an alkyloxy group, an aryloxy group, an alkylsulfonamido group, an arylsulfonamido group, an alkylamino group, an arylamino group, a heterocyclic amino group, an alkylthio group, an arylthio group, a hydroxy group or a halogen atom is preferred, and a compound where $R_1$ represents an aryl group or a heterocyclic group, $R_2$ represents a hydrogen atom or an alkyl group, $R_3$ represents an alkyloxycarbonyl group, an alkylsulfonyl group or a cyano group, and $G_1$, $G_2$ and $G_3$ each independently represents an alkylamino group, an arylamino group or a heterocyclic amino group is most preferred.

As for the preferred combination of substituents in the coloring matter represented by formula (3-2) of the present invention, a compound where at least one of various substituents is the above-described preferred group is preferred, a compound where a larger number of various substituents are the above-described preferred groups is more preferred, and a compound where all substituents are the above-described preferred groups is most preferred.

The combination particularly preferred as the coloring matter represented by formula (3-2) of the present invention is a combination containing the following (i) to (v).

(i) $R_1$ is preferably a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted acyl group, a substituted or unsubstituted alkyloxycarbonyl group, a substituted or unsubstituted aryloxycarbonyl group, a substituted or unsubstituted carbamoyl group, a substituted or unsubstituted alkylsulfonyl group, a substituted or unsubstituted arylsulfonyl group, or a substituted or unsubstituted sulfamoyl group, more preferably a substituted alkyl group, a substituted alkenyl group, a substituted alkynyl group, a substituted aralkyl group, a substituted aryl group or a substituted heterocyclic group, still more preferably a substituted alkyl group, a substituted aryl group or a substituted heterocyclic group, still even more preferably a substituted aryl group or a substituted heterocyclic group, and most preferably an aryl group having an ionic hydrophilic group as a substituent or a heterocyclic group having an ionic hydrophilic group as a substituent.

(ii) $R_2$ is preferably a hydrogen atom, a halogen atom, an alkyl group, an aryl group, a heterocyclic group, a cyano group, an alkoxy group, an amido group, a ureido group, an alkylsulfonylamino group, an arylsulfonylamino group, a sulfamoyl group, an alkylsulfonyl group, an arylsulfonyl group, a carbamoyl group or an alkoxycarbonyl group, more preferably a hydrogen atom, a halogen atom, an alkyl group, an aryl group, a cyano group, an alkylsulfonyl group, an arylsulfonyl group or a heterocyclic group, still more preferably a hydrogen atom, an alkyl group, an aryl group, a cyano group or an alkylsulfonyl group, and most preferably a hydrogen atom or an alkyl group.

(iii) $X_2$ is preferably —$CR_3$= or a nitrogen atom, more preferably —$CR_3$=.

(iv) $R_3$ is preferably an acyl group having a carbon number of 2 to 12, an acyloxy group having a carbon number of 2 to 12, a carbamoyl group having a carbon number of 1 to 12, an alkyloxycarbonyl group having a carbon number of 2 to 12, an aryloxycarbonyl group having a carbon number of 7 to 18, a cyano group, a nitro group, an alkylsulfinyl group having a carbon number of 1 to 12, an alkylsulfinyl group having a carbon number of 6 to 18, an alkylsulfonyl group having a carbon number of 1 to 12, an arylsulfonyl group having a carbon number of 6 to 18, a sulfamoyl group having a carbon number of 0 to 12, a halogenated alkyl group having a carbon number of 1 to 12, a halogenated alkyloxy group having a carbon number of 1 to 12, a halogenated alkylthio group having a carbon number of 1 to 12, a halogenated aryloxy group having a carbon number of 7 to 18, an aryl group having a carbon number of 7 to 18 and being substituted by two or more other electron-withdrawing groups each having a σp value of 0.20 or more, or a 5- to 8-membered heterocyclic group containing a nitrogen atom, an oxygen atom or a sulfur atom and having a carbon number of 1 to 18, more preferably a cyano group, an alkylsulfonyl group having a carbon number of 1 to 12, an arylsulfonyl group having a carbon number of 6 to 18 or a sulfamoyl group having a carbon number of 0 to 12, still more preferably a cyano group, an alkylsulfonyl group having a carbon number of 1 to 12 or a sulfamoyl group having a carbon number of 0 to 12, still even more preferably a cyano group or an alkylsulfonyl group having a carbon number of 1 to 12, and most preferably a cyano group.

(v) $G_1$, $G_2$ and $G_3$ each is, independently, preferably a hydrogen atom, an alkyl group, a heterocyclic group, an acylamino group, an alkyloxy group, an aryloxy group, an alkylsulfonamido group, an arylsulfonamido group, an alkylamino group, an arylamino group, a heterocyclic amino group, an alkylthio group, an arylthio group, a hydroxy group or a halogen atom, more preferably an alkylamino group, an arylamino group or a heterocyclic amino group, still more preferably an alkylamino group or an arylamino group. Most preferably, $G_1$ is an arylamino group, $G_2$ is an alkylamino group, and $G_3$ is an alkylamino group.

In the present invention, when the compounds represented by formulae (1), (3), (4), (5), (6), (2-1), (3-1) and (3-2) are required to have hydrophilicity, the compound preferably contains in the molecule 2 or more ionic hydrophilic groups, more preferably from 2 to 10 ionic hydrophilic groups, still more preferably, from 3 to 6 ionic hydrophilic groups.

However, when water is not used as the medium, the compound may not contain an ionic hydrophilic group.

The ionic hydrophilic group may be any ionic hydrophilic group as long as it is an ionic dissociative group. Specific examples thereof include a sulfo group, a carboxyl group (including a salt thereof), a hydroxyl group (may be a salt), a phosphono group (may be a salt) and a quaternary ammonium.

The ionic hydrophilic group is preferably a sulfo group, a carboxyl group or a hydroxyl group (including a salt thereof).

In the case where the ionic hydrophilic group is a salt, preferred counter cations include an alkali metal (e.g., lithium, sodium, potassium), ammonium and an organic cation (e.g., pyridinium, tetramethylammonium, guanidium). Among these, an alkali metal is preferred and a lithium salt is more preferred when a sulfo group, or a sodium or potassium salt is more preferred when a carboxy group.

In the case of a water-soluble coloring matter represented by formula (1), (3), (4), (5), (6), (2-1), (3-1) or (3-2), from the standpoint of color reproducibility, the compound preferably has a maximum absorption wavelength (λmax) of 380 to 490 nm, more preferably λmax of 400 to 480 nm, still more preferably λmax of 420 to 460 nm, in $H_2O$.

Specific examples of the coloring matters represented by formula (1), (3), (4), (5), (6), (2-1), (3-1) and (3-2) are set forth below, but the coloring matter for use in the present invention is not limited to these examples.

In the following specific examples, the structure is shown by the form of a free acid, but these can be of course used as an arbitrary salt.

Preferred counter cations include an alkali metal (e.g., lithium, sodium, potassium), ammonium and an organic cation (e.g., pyridinium, tetramethylammonium, guanidium).

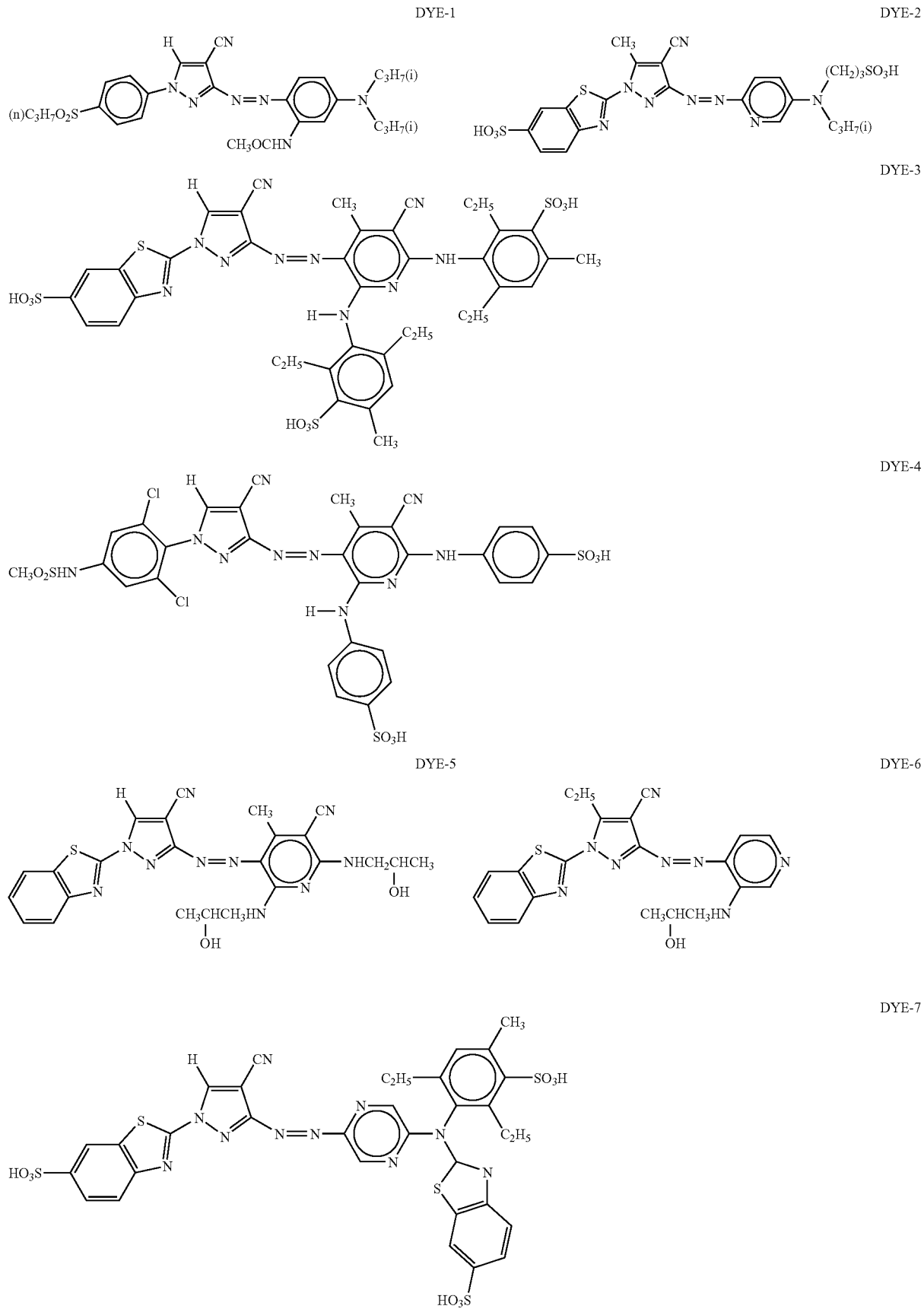

-continued
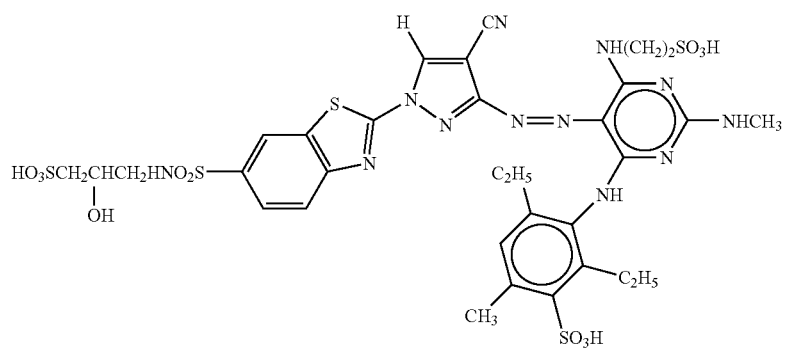
DYE-8
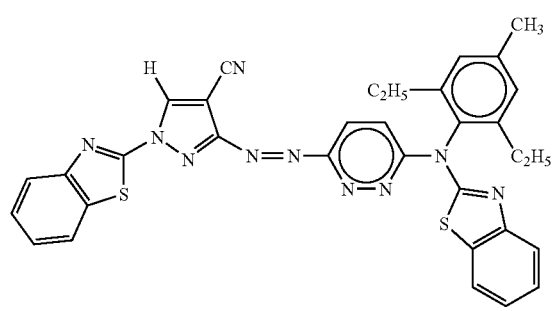
DYE-9
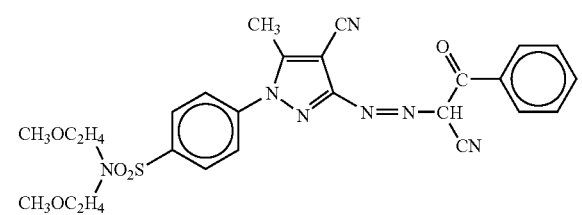
DYE-10
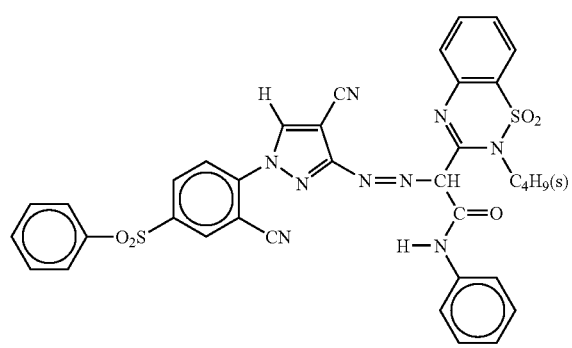
DYE-11
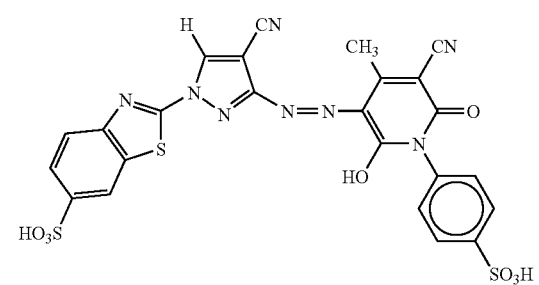
DYE-12
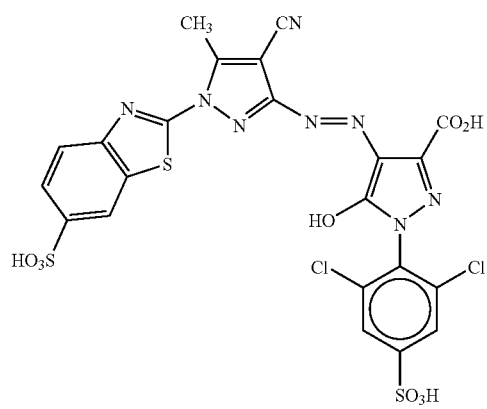
DYE-13

-continued
DYE-14
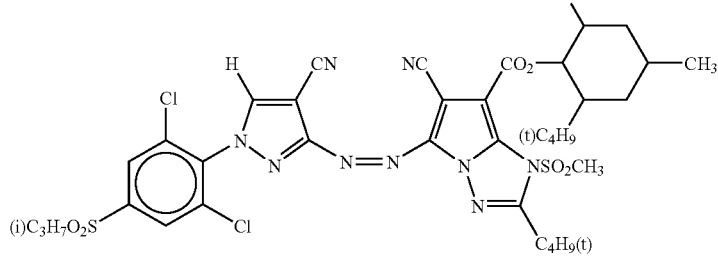
DYE-15
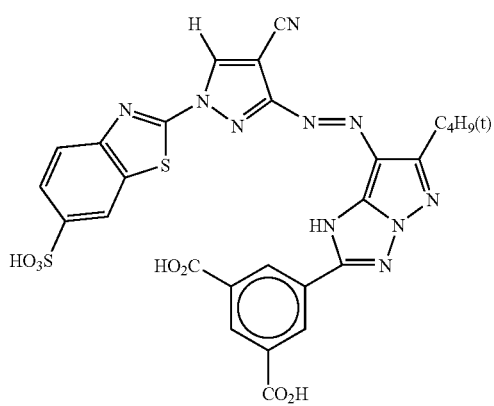
DYE-16
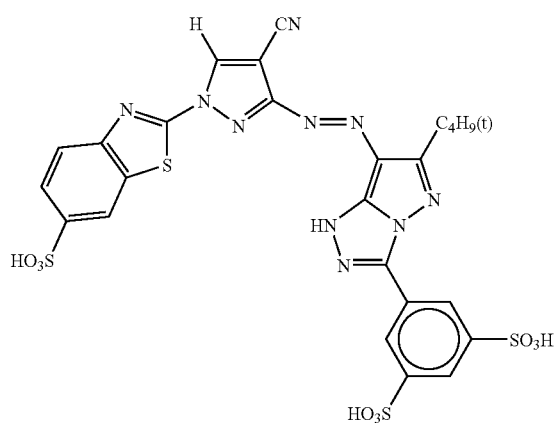
DYE-17
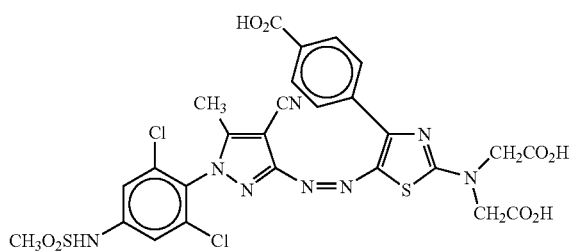
DYE-18
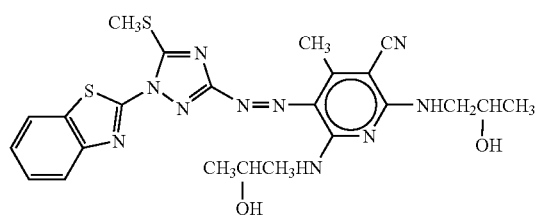
DYE-19
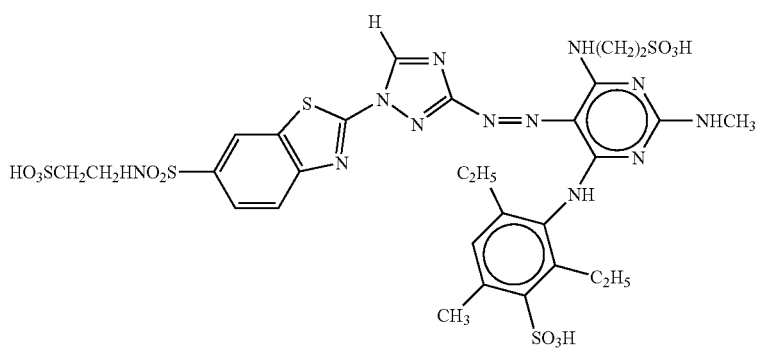

-continued
DYE-20
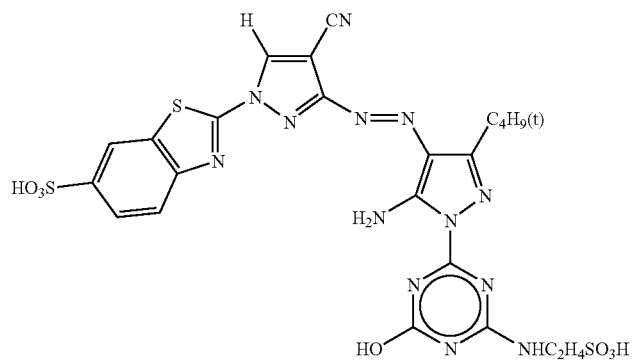
DYE-21
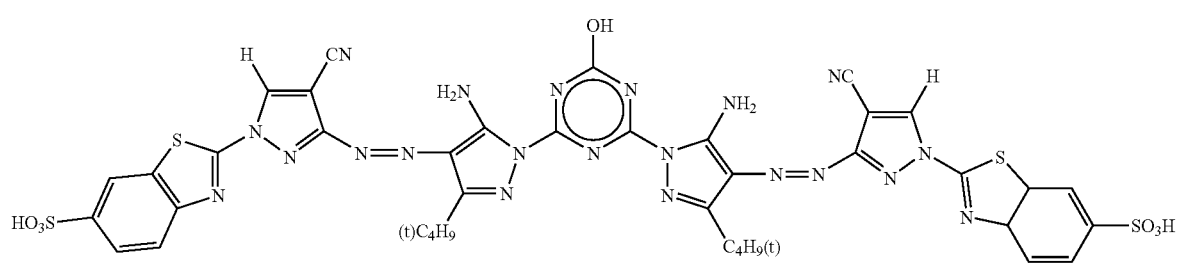
DYE-22
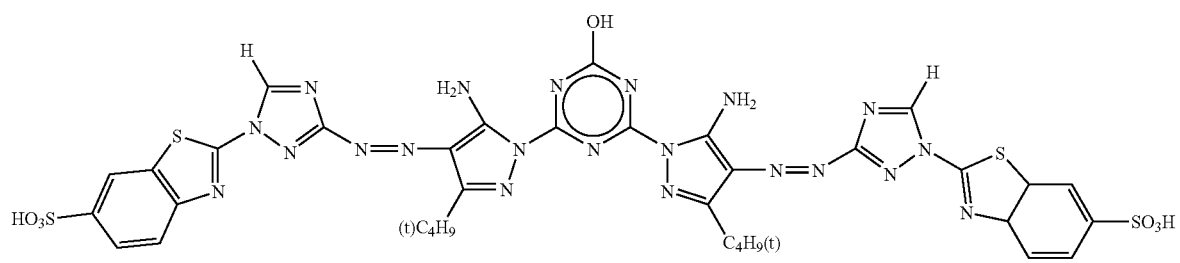
DYE-23
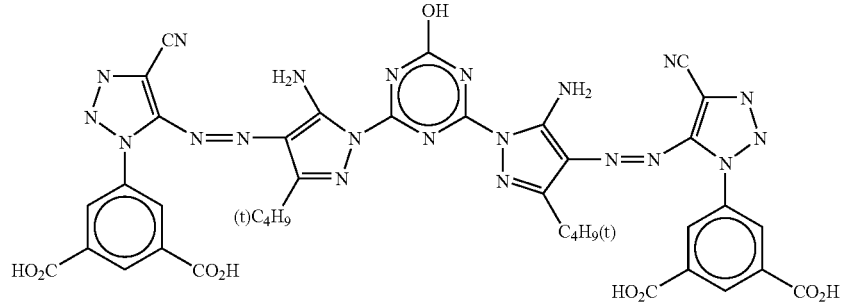
DYE-24
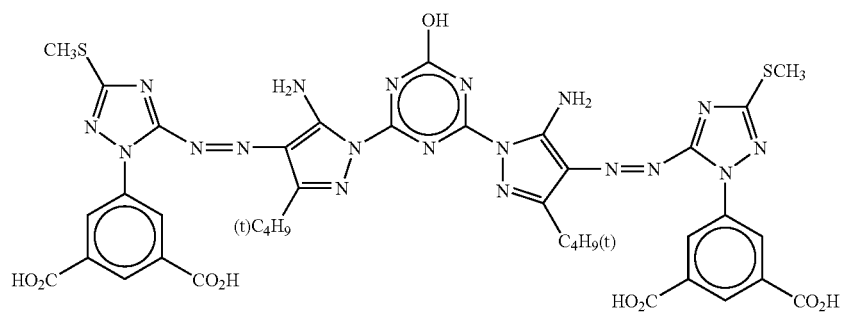

-continued
DYE-25
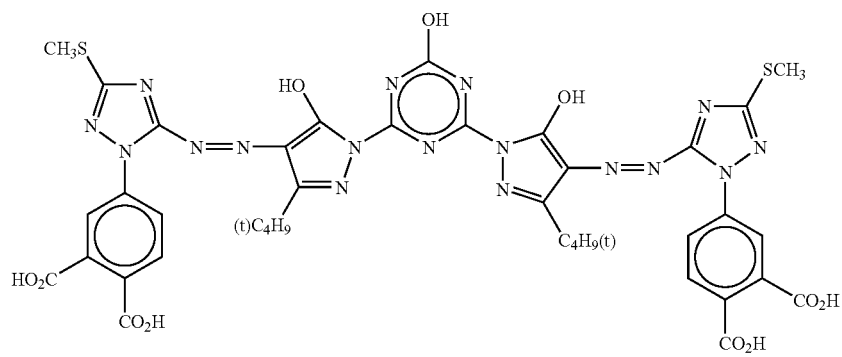
DYE-26
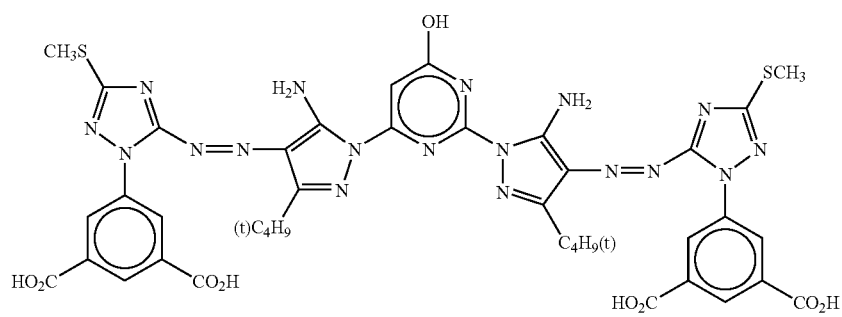
DYE-27
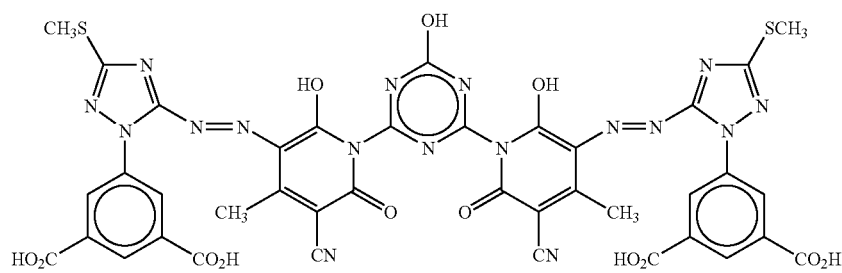
DYE-28
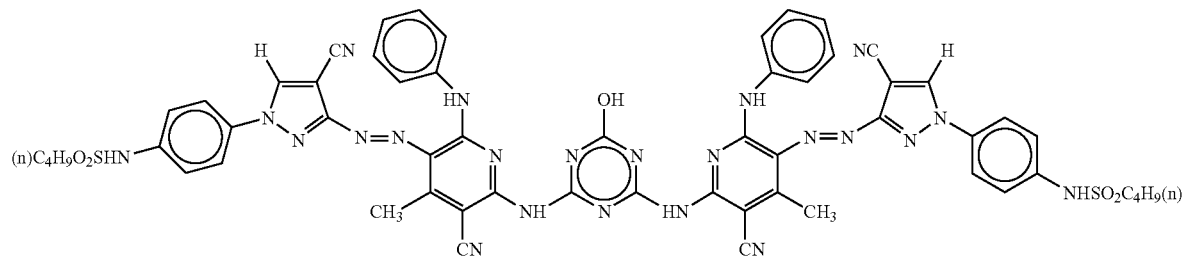
DYE-29
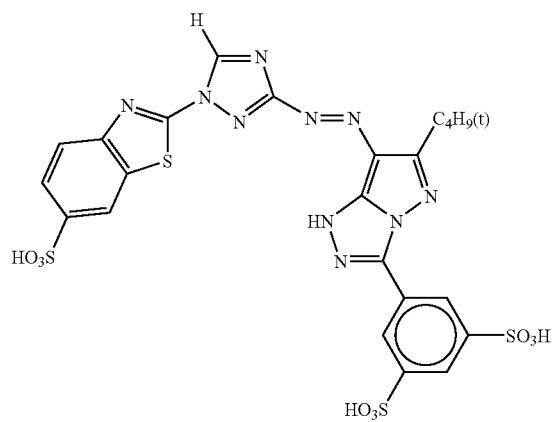

The usage of the coloring matter of the present invention includes an image recording material for forming an image, particularly, a color image, and an inkjet system recording material is preferred.

The coloring matter of the present invention is used by selecting the substituents to adjust the physical properties suitable for the intended use, such as solubility, dispersibility and thermal mobility. Also, the coloring matter of the present invention can be used in the form of a solution, an emulsion dispersion or a solid dispersion according to the system used.
(Ink)

The ink of the present invention means an ink containing at least one coloring matter of the present invention.

The ink of the present invention may contain a medium and when a solvent is used as the medium, this is suitable particularly as an inkjet recording ink. The ink of the present invention may be produced by using a lipophilic or aqueous medium and dissolving and/or dispersing the coloring matter of the present invention in such a medium.

Use of an aqueous medium is preferred. The ink of the present invention includes an ink composition excluding the medium. If desired, the ink of the present invention may contain other additives within the range of not impairing the effects of the present invention. Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent (described in JP-A-2003-306623). These various additives are directly added to the ink solution in the case of a water-soluble ink. When an oil-soluble dye is used in the form of a dispersion, the additives are generally added to the dispersion after the preparation of a dye dispersion but may be added to the oil or aqueous phase at the preparation.

In the case of dispersing the coloring matter of the present invention in an aqueous medium, a coloring fine particle containing the coloring matter and an oil-soluble polymer is preferably dispersed in an aqueous medium as described in JP-A-11-286637, JP-A-2001-240763 (Japanese Patent Application No. 2000-78491), JP-A-2001-262039 (Japanese Patent Application No. 2000-80259) and JP-A-2001-247788 (Japanese Patent Application No. 2000-62370), or the coloring matter of the present invention dissolved in a high boiling point organic solvent is preferably dispersed in an aqueous medium as described in JP-A-2001-262018 (Japanese Patent Application No. 2000-78454), JP-A-2001-240763 (Japanese Patent Application No. 2000-78491) and JP-A-2001-335734 (Japanese Patent Application No. 2000-203856). As for the specific method for dispersing the coloring matter of the present invention in an aqueous medium, the oil-soluble polymer, high boiling point organic solvent and additives used, and the amounts thereof, those described in the patent publications above can be preferably used. Also, the azo coloring matter which is a solid matter may be dispersed as it is in a fine particle state. At the dispersion, a dispersant or a surfactant may be used.

As for the dispersing device, a simple stirrer, an impeller stirring system, an in-line stirring system, a mill system (e.g., colloid mill, ball mill, sand mill, attritor, roll mill, agitator mill), an ultrasonic system and a high-pressure emulsion dispersion system (high-pressure homogenizer; specific examples of the commercially available device include Gaulin Homogenizer, Microfluidizer and DeBEE 2000) can be used. The preparation method of the inkjet recording ink is described in detail, in addition to the patent publications described above, in JP-A-5-148436, JP-A-5-295312, JP-A-7-97541, JP-A-7-82515, JP-A-7-118584, JP-A-11-286637 and JP-A-2001-271003 (Japanese Patent Application No. 2000-87539), and the methods described in these patent publications can be also used for the preparation of the inkjet recording ink of the present invention.

As the aqueous medium, a mixture mainly comprising water and containing, if desired, a water-miscible organic solvent may be used. Examples of the water-miscible organic solvent which can be used include those described in JP-A-2003-306623. Incidentally, these water-miscible organic solvents may be used in combination of two or more species thereof.

The inkjet recording ink of the present invention preferably contains the coloring matter of the present invention in an amount of 0.1 to 20 parts by mass, more preferably from 0.2 to 10 parts by mass, still more preferably from 0.5 to 9 parts by mass, per 100 parts by mass of the ink. Furthermore, in the inkjet ink of the present invention, other coloring matters may be used together with the coloring matter of the present invention. In the case of using two or more kinds of coloring matters in combination, the total content of the coloring matters is preferably in the above-described range.

The ink of the present invention can be used not only for the formation of a monochromatic image but also for the formation of a full color image. For forming a full color image, a magenta tone ink, a cyan tone ink and a yellow tone ink may be used. Also, for adjusting the color tone, a black tone ink may be further used.

In the inkjet recording ink according to the present invention, another yellow dye may be used at the same time in addition to the coloring matter of the present invention. As for each of yellow, magenta and cyan dyes which can be applied, an arbitrary dye may be used, but dyes described in JP-A-2003-306623, paragraphs 0090 to 0092 may be used. The black coloring material which can be applied includes a disazo, trisazo or tetraazo dye and a carbon black dispersion.
(InkJet Recording Method)

According to the inkjet recording method of the present invention, an energy is provided to the inkjet recording ink and an image is thereby formed on a known image-receiving material such as plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal and ceramic. Incidentally, those described in JP-A-2003-306623, paragraphs 0093 to 0105, can be applied as the inkjet recording method of the present invention.

In forming an image, a polymer latex compound may be used in combination for the purpose of giving glossiness or water resistance or improving the weather resistance. The timing of imparting the latex compound to the image-receiving material may be before, after or simultaneous with the addition of colorant. Accordingly, the site to which the latex compound is added may be in the image-receiving paper or ink, or a liquid material of the polymer latex alone may be prepared and used. Specifically, the methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944), JP-A-2002-080759 (Japanese Patent Application No. 2000-268952), JP-A-2002-187342 (Japanese Patent Application No. 2000-

299465) and JP-A-2002-172774 (Japanese Patent Application No. 2000-297365) can be preferably used.

EXAMPLES

The present invention is described in greater detail below by referring to Examples, but the present invention is not limited thereto.

Example 1

Ultrapure water (resistance value: 18 MΩ or more) was added to the following components to make 1 liter, and the resulting solution was stirred for 1 hour under heating at 50 to 60° C. Thereafter, the solution was filtrated under reduced pressure through a microfilter having an average pore size of 0.25 μm to prepare Yellow Ink Solution Y-101.
(Formulation of Yellow Ink Y-101)

| (Solid Contents) | |
|---|---|
| Yellow dye of the present invention (lithium salt of DYE-3) | 50 g/liter |
| PROXEL XL2 (S) (produced by Avecia Ltd.) | 5 g/liter |
| Urea | 10 g/liter |
| (Liquid Component) | |
| Triethylene glycol monobutyl ether | 101 g/liter |
| Glycerin (GR) | 118 g/liter |
| Triethylene glycol | 95 g/liter |
| 2-Pyrrolidone | 20 g/liter |
| Triethanolamine (TEA) | 10 g/liter |
| SURFYNOL 465 (SW) (produced by Air Products & Chemicals, Inc.) | 10 g/liter |

Ink Solutions Y-102 to 107 were prepared in the same manner as in the preparation of Ink Solution Y-101 except for changing the coloring matter as shown in Table 1 below.

As an ink solution for comparison, Ink Solution 201 was prepared by using Comparative Coloring Matter a in Table 1. Comparative Coloring Matter a:

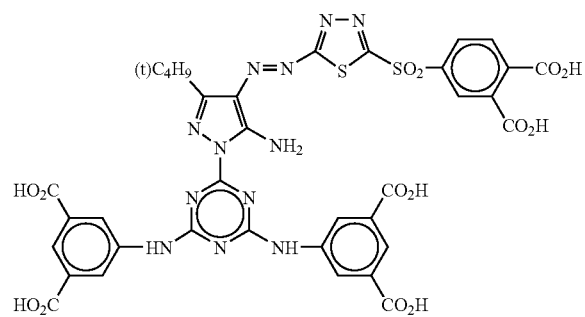

In changing the coloring matter, each coloring matter was used such that the amount added thereof became equimolar with respect to Ink Solution Y-101.

Also, a yellow ink cartridge of PM-G800 manufactured by Seiko Epson Corporation was used as an ink for comparison.

As for the "ejection stability", "light fastness", "heat fastness", "ozone (gas) resistance" and "solution stability" in Table 1, each ink was filled in a yellow ink cartridge of an inkjet printer, PM-G800, manufactured by Seiko Epson Corporation and by using the inks of PM-G800 for other colors, a yellow monochromatic image pattern with the density being stepwise changed and an image pattern comprising green, red and gray were printed on an image-receiving sheet, that is, EPSON Photographic Paper <KOTAKU> or EPSON photographic paper CRISPIA <KOKOTAKU>, to evaluate image quality, ink ejection and image fastness.

The inkjet ink prepared in each of Examples (Ink Solutions Y101, 102, 103, 104, 105, 106 and 107) and Comparative Examples (Ink Solution 101 and the yellow ink of PM-G800) was evaluated as follows. The results obtained are shown in Table 1.
(Evaluation Test)

1) As for the ejection stability, after setting the cartridge in the printer and confirming the ejection of ink from all nozzles, the image pattern was output on 20 sheets of A4-size paper and rated based on the following criteria:
A: Printing was not disordered from start through end of the printing.
B: Printing was disordered in some outputs.
C: Printing was disordered from start through end of the printing.

2) As for the image preservability, the following evaluations were performed by using a printed sample.
[1] In the evaluation of light fastness, the image density Ci immediately after printing was measured by X-rite 310, the image was then irradiated with xenon light (100,000 lx) for 14 days by the use of Weathermeter manufactured by Atlas, and the image density Cf was again measured. The dye residual ratio Cf/Ci×100 was determined and evaluated. The dye residual ratio was evaluated at three points having a reflection density of 1, 1.5 and 2, and the light fastness was rated A when the dye residual ratio was 80% or more at any density, rated B when less than 80% at two points, or rated C when less than 80% at all points.

[2] In the evaluation of heat fastness, the density was measured by X-rite 310 before and after the sample was stored for 7 days under the conditions of 80° C. and 60% RH, and the dye residual ratio was determined and evaluated. The dye residual ratio was evaluated at three points having a reflection density of 1, 1.5 and 2, and the heat fastness was rated A when the dye residual ratio was 95% or more at any density, rated B when less than 95% at two points, or rated C when less than 95% at all points.

[3] In the evaluation of ozone resistance, the sample was left standing for 14 days in a box set to an ozone gas concentration of 5 ppm, and the image density before and after standing in the ozone gas atmosphere was measured by a reflection densitometer (X-Rite 310TR) and evaluated as the coloring matter residual ratio. The reflection density was measured at three points of 1, 1.5 and 2.0. The ozone gas concentration in the box was set by using an ozone gas monitor (Model OZG-EM-01) manufactured by APPLICS.

The ozone resistance was rated on a three-stage scale, namely, rated A when the dye residual ratio was 80% or more at any density, rated B when less than 80% at one or two point(s), or rated C when less than 70% at all points.

3) Color Tone:
Using a yellow monochromatic image pattern with the density being stepwise changed, the a*b* values were calculated based on the CIE L*a*b* color space system by means of Spectro Eye manufactured by Gretag Macbeth. A preferred yellow tone was defined as follows, and the color tone was rated on a three-stage scale of A, B and C below. The results obtained are shown in Table 1.
Preferred L*: 90 or more
Preferred a*: from −5 to −11
Preferred b*: from 80 to 95

4) Solution Stability:
The absorbance of an aqueous 10 mass % dye solution was measured after aging at 60° C. (pH: about 8.0) for 10 days, and the rate of change with respect to the absorbance at room temperature (23° C.) is shown in Table 1 below.

TABLE 1

| Ink | Ejection Stability | [1] Light Fastness | [2] Heat Fastness | [3] Ozone Fastness | Color Tone | Solution Stability | Coloring Matter No.; in case of free acid type, counter cation in parenthesis |
|---|---|---|---|---|---|---|---|
| Y101 | A | A | A | A | A | 99.8 | DYE-3 (lithium salt) |
| Y102 | A | A | A | A | A | 99.7 | DYE-8 (lithium salt) |
| Y103 | A | A | A | A | A | 99.7 | DYE-15 (sodium salt) |
| Y104 | A | A | A | A | A | 99.8 | DYE-16 (lithium salt) |
| Y105 | A | A | A | A | A | 99.7 | DYE-21 (lithium salt) |
| Y106 | A | A | A | A | A | 98.9 | DYE-22 (lithium salt) |
| Y107 | A | A | A | A | A | 98.9 | DYE-24 (sodium salt) |
| Y201 | A | B | A | B | C | 49.8 | Comparative Coloring Matter a (sodium salt) |
| PM-G800Y | A | C | B | C | B | 99.9 | — |

As apparent from the results in Table 1, the system using the ink of the present invention is excellent in all performances. Particularly, the fastness of image is excellent as compared with Comparative Examples.

Example 2

An image was printed by using the inks produced in Example 1 and the same printer as in Example 1 on Inkjet Paper GASAI (photographic finish) produced by Fuji Photo Film Co., Ltd., and the same evaluations as in Example 1 were performed. Then, the same results were obtained.

Example 3

(Production of Ink Solution Y-301)

A coloring matter of the present invention (DYE-5) (2.5 g) and 7.04 g of sodium dioctylsulfosuccinate were dissolved in 4.22 g of High Boiling Point Organic Solvent (s-2) shown below, 5.63 g of High Boiling Point Organic Solvent (s-11) shown below and 50 ml of ethyl acetate at 70° C. To the resulting solution, 500 ml of deionized water was added while stirring with a magnetic stirrer to prepare an oil-in-water coarse particle dispersion. This coarse particle dispersion was passed through Microfluidizer (manufactured by Microfluidex Inc.) five times under a pressure of 600 bar, thereby effecting microparticulation. The resulting emulsion was subjected to solvent removal in a rotary evaporator until the ethyl acetate odor disappeared. To the thus-obtained fine emulsion of hydrophobic dye, 140 g of diethylene glycol, 50 g of glycerin, 7 g of SURFYNOL 465 (produced by Air Products & Chemicals, Inc.) and 900 ml of deionized water were added to produce Ink Solution Y-301. This ink had a pH of 8.3, a viscosity of 4.2 mPa·S and a surface tension of 31 mN/m.

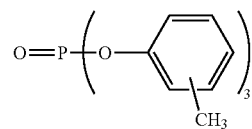

S-2

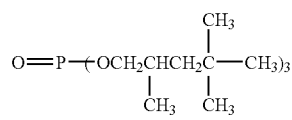

S-11

(Production of Ink Solution)

Ink Solution 401 was produced in the same manner as Ink Solution 301D except for changing the coloring matter of the present invention in Ink Solution D to the comparative coloring matter in Table 2 below. The pH, viscosity and surface tension of the ink solution were the same as those of Ink Solution 301.

(Image Recording and Evaluation)

Ink Solution 301 and Comparative Ink Solution 401 were evaluated as follows. The results obtained are shown in Table 3.

In Table 2, the contents of "light fastness", "heat resistance", "ozone (gas) fastness", "color tone" and "ink stability" are the same as those described in Example 1.

TABLE-2

| Ink Solution | [1] Light Fastness | [2] Heat Fastness | [3] Ozone Fastness | Color Tone | Ink stability | Coloring Matter No. |
|---|---|---|---|---|---|---|
| 301 (Invention) | A | A | A | A | 99.8 | DYE-5 |

TABLE-2-continued

| 401 (Comparative Example) | C | A | C | B | 99.9 | Comparative Coloring Matter C |

Comparative Coloring Matter c

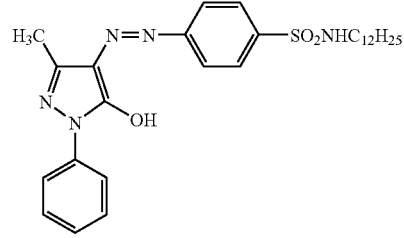

As apparent from Table 2, the inkjet ink of the present invention was excellent in light fastness, heat fastness, ozone gas fastness, color tone and ink stability.

Example 4

An image was printed by using the inks produced in Example 3 and the same printer as in Example 3 on Inkjet Paper GASAI (photographic finish) produced by Fuji Photo Film Co., Ltd., and the same evaluations as in Example 3 were performed. Then, the same results as in Example 3 were obtained.

INDUSTRIAL APPLICABILITY

The coloring matter of the present invention exhibits excellent storage stability in an ink, has absorption characteristics to give excellent color reproduction as a coloring matter for three primary colors and at the same time, is assured of sufficiently high fastness to light, heat, moisture and active gases in the environment. Also, this coloring matter is suitable for various coloring compositions of giving a color image or color material excellent in the color hue and fastness, for example, an ink for printing such as inkjet printing or a dyeing solution for dyeing various fibers. In particular, by the use of this coloring matter, an inkjet recording ink and an inkjet recording method, where excellent storage stability of ink and formation of an image with good color hue and high fastness to light and active gases in the environment (particularly ozone gas) are ensured, can be provided.

The invention claimed is:

1. An ink comprising at least one coloring matter represented by formula (5):

Formula (5)

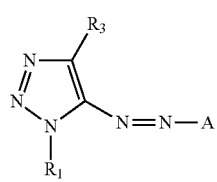

wherein $R_1$ represents an aryl group having an ionic hydrophilic group;

$R_3$ represents an electron-withdrawing group having a σp value of 0.20 or more; and A represents one group selected from the group consisting of the monovalent substituent groups in a formula (2), which may have a substituent:

Formula (2):

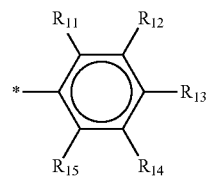
(A-1)

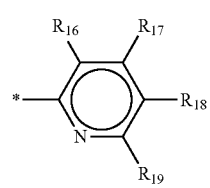
(A-2)

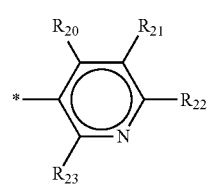
(A-3)

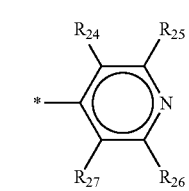
(A-4)

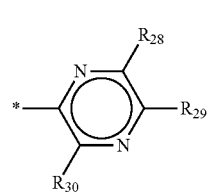
(A-5)

-continued
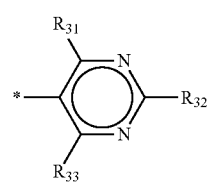
(A-6)
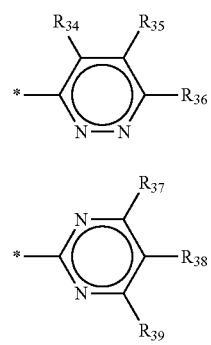
(A-7)
(A-8)
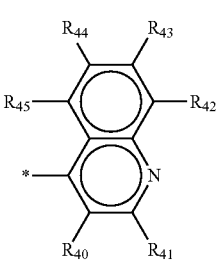
(A-9)
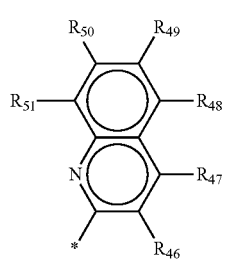
(A-10)
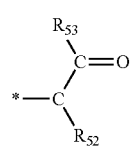 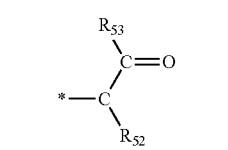
(A-11)
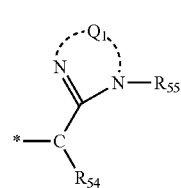
(A-12)
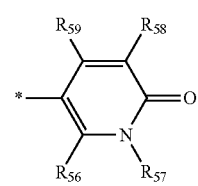
(A-13)
-continued
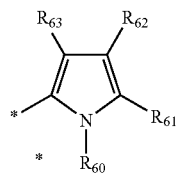
(A-14)
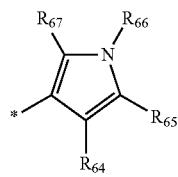
(A-15)
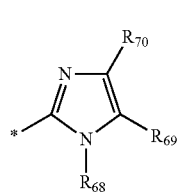
(A-16)
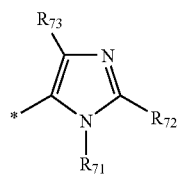
(A-17)
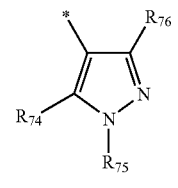
(A-18)
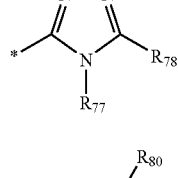
(A-19)
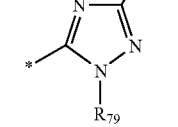
(A-20)
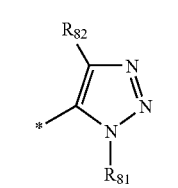
(A-21)
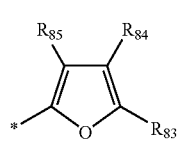
(A-22)

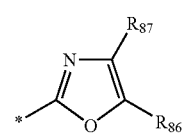 (A-23)
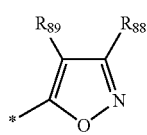 (A-24)
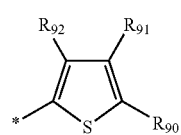 (A-25)
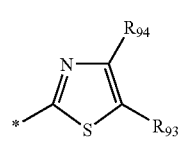 (A-26)
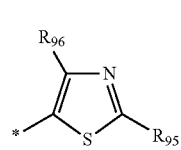 (A-27)
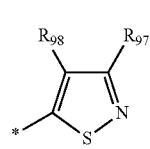 (A-28)
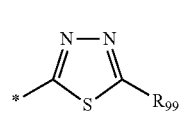 (A-29)
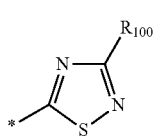 (A-30)
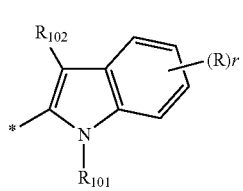 (A-31)
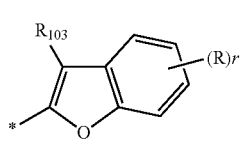 (A-32)
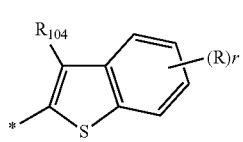 (A-33)
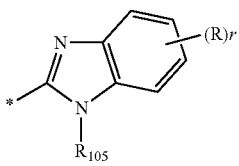 (A-34)
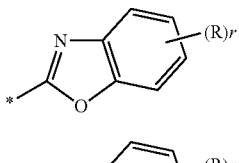 (A-35)
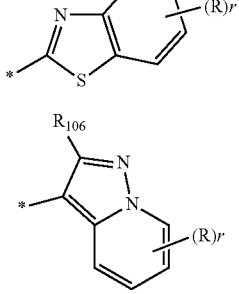 (A-36)
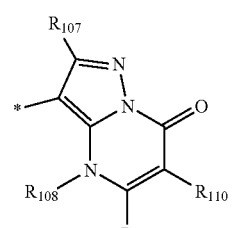 (A-37)
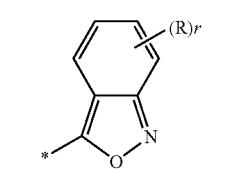 (A-38)
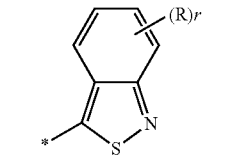 (A-39)
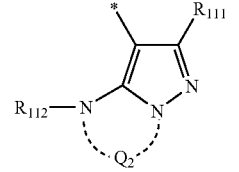 (A-40)
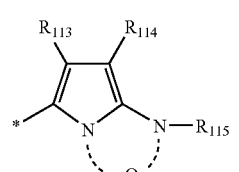 (A-41)
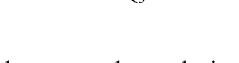 (A-42)
wherein in the monovalent substituent groups (A-1) to (A-42) represented by the formula (2), $R_{11}$ to $R_{115}$ each independently represents one of a hydrogen atom and a substituent; $Q_1$ in (A-12), $Q_2$ in (A-41) and $Q_3$ in (A-42) each represents a nonmetallic atom group necessary for forming one of a 5- to 7-membered hydrocarbon ring together with the nitrogen atom and a 5- to 7-membered heterocyclic ring together with the nitrogen atom; R represents a substituent; r represents an integer of 0 to 4; and when a plurality of substituent R are present, each R's may be independently the same or different.

2. The ink as claimed in claim 1, wherein the coloring matter represented by formula (5) contains 2 or more ionic hydrophilic groups in the molecule.

3. The ink as claimed in claim 2, wherein the coloring matter represented by formula (5) contains 3 to 6 ionic hydrophilic groups in the molecule.

4. The ink as claimed in claim 1, wherein A represents one selected from the group consisting of the monovalent substituent groups (A-1) to (A-40).

5. An ink comprising at least one coloring matter represented by formula (6):

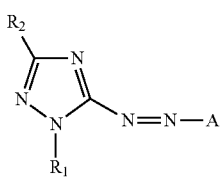

Formula (6)

wherein $R_1$ represents an aryl group having an ionic hydrophilic group;

$R_2$ represents one of a hydrogen atom and a substituent, and when $R_2$ represents a substituent, $R_2$ may have a substituent; and A represents one group selected from the group consisting of the monovalent substituent groups in a formula (2), which may have a substituent:

Formula (2):

(A-1)

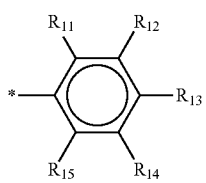

(A-2)

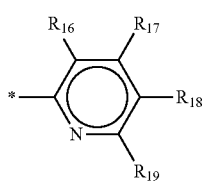

(A-3)

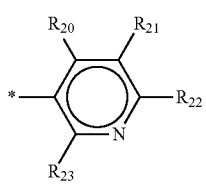

(A-4)

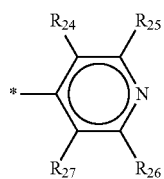

(A-5)

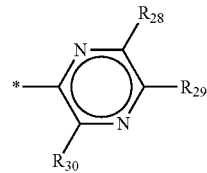

(A-6)

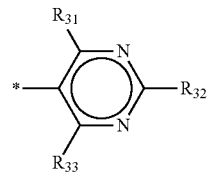

(A-7)

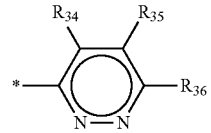

(A-8)

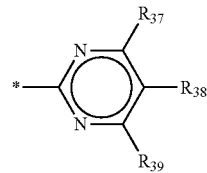

(A-9)

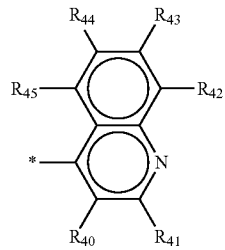

(A-10)

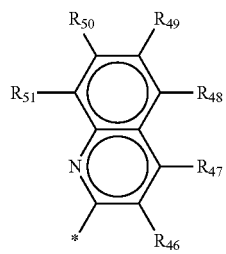

(A-11)

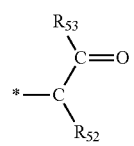

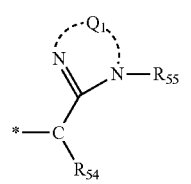
(A-12)
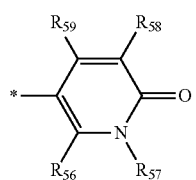
(A-13)
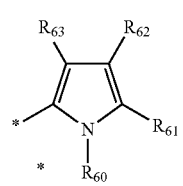
(A-14)
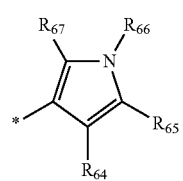
(A-15)
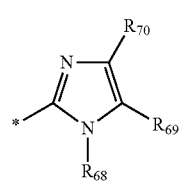
(A-16)
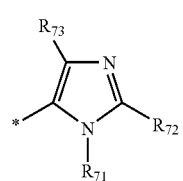
(A-17)
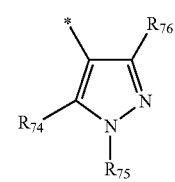
(A-18)
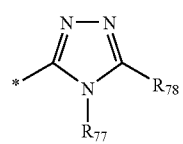
(A-19)
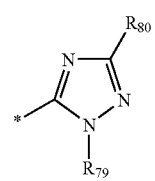
(A-20)
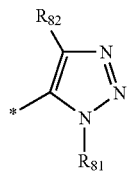
(A-21)
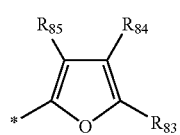
(A-22)
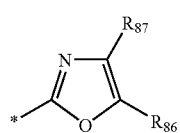
(A-23)
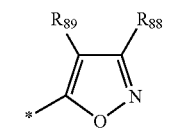
(A-24)
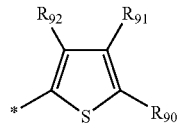
(A-25)
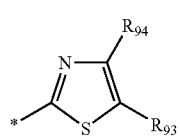
(A-26)
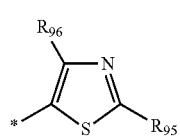
(A-27)
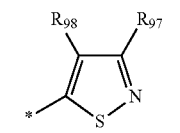
(A-28)
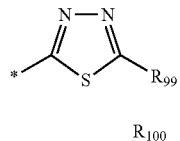
(A-29)
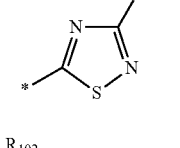
(A-30)
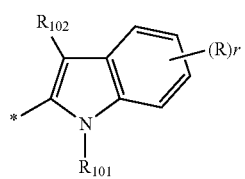
(A-31)

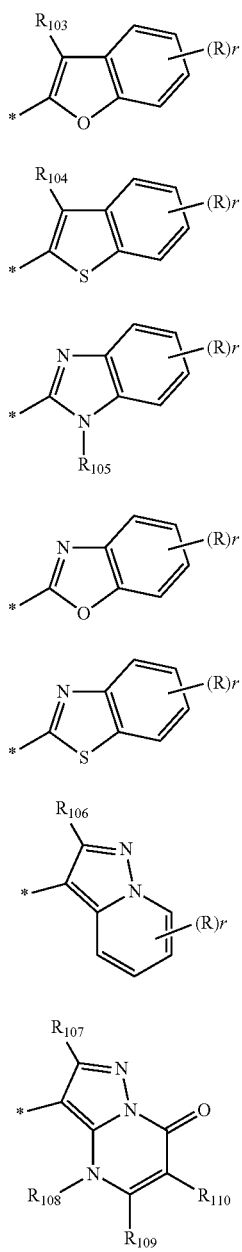

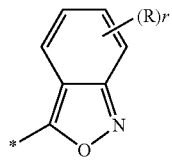

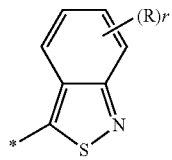

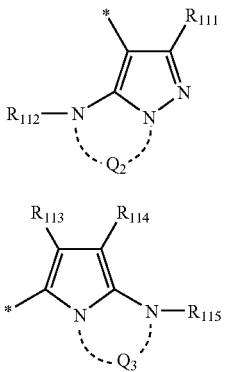

wherein in the monovalent substituent groups (A-1) to (A-42) represented by the formula (2), $R_{11}$ to $R_{115}$ each independently represents one of a hydrogen atom and a substituent; $Q_1$ in (A-12), $Q_2$ in (A-41) and $Q_3$ in (A-42) each represents a nonmetallic atom group necessary for forming one of a 5- to 7-membered hydrocarbon ring together with the nitrogen atom and a 5- to 7-membered heterocyclic ring together with the nitrogen atom; R represents a substituent; r represents an integer of 0 to 4; and when a plurality of substituent R are present, each R's may be independently the same or different.

6. The ink as claimed in claim 5, wherein the coloring matter represented by formula (5) contains 2 or more ionic hydrophilic groups in the molecule.

7. The ink as claimed in claim 6, wherein the coloring matter represented by formula (5) contains 3 to 6 ionic hydrophilic groups in the molecule.

8. The ink as claimed in claim 5, wherein $R_1$ represents a phenyl group having an ionic hydrophilic group.

* * * * *